US011861619B1

(12) United States Patent
Vijayaraghavan

(10) Patent No.: US 11,861,619 B1
(45) Date of Patent: Jan. 2, 2024

(54) SYSTEMS AND METHODS FOR PAYMENT TRANSACTIONS, ALERTS, DISPUTE SETTLEMENT, AND SETTLEMENT PAYMENTS, USING MULTIPLE BLOCKCHAINS

(71) Applicant: Vantiv, LLC, Symmes Township, OH (US)

(72) Inventor: Ramesh Vijayaraghavan, Mason, OH (US)

(73) Assignee: Worldpay, LLC, Symmes Township, OH (US)

( * ) Notice: Subject to any disclaimer, the term of this patent is extended or adjusted under 35 U.S.C. 154(b) by 477 days.

(21) Appl. No.: 15/827,937

(22) Filed: Nov. 30, 2017

(51) Int. Cl.
*G06Q 20/40* (2012.01)
*G06Q 20/08* (2012.01)
*H04L 67/10* (2022.01)
*G06Q 20/38* (2012.01)
*H04L 67/104* (2022.01)

(52) U.S. Cl.
CPC ....... *G06Q 20/4016* (2013.01); *G06Q 20/085* (2013.01); *G06Q 20/3827* (2013.01); *G06Q 20/3829* (2013.01); *H04L 67/104* (2013.01)

(58) Field of Classification Search
USPC .......................................................... 705/69
See application file for complete search history.

(56) References Cited

U.S. PATENT DOCUMENTS 11,188,907 B1 * 11/2021 Vijayvergia ......... G06Q 20/401
2002/0143655 A1 * 10/2002 Elston .................... G06Q 20/04
705/26.81

(Continued)

FOREIGN PATENT DOCUMENTS

EP        2382588 A2 * 11/2011 ........... G06Q 20/405
WO    WO-2011103520 A1 *  8/2011 ............. G06Q 20/20

OTHER PUBLICATIONS

Callen-Naviglia, Jennifer, "The Technological, Economic and Regulatory Challenges of Digital Currency: An Exploratory Analysis of Federal Judicial Cases involving Bitcoin", Robert Morris University, 2017. (Year: 2017).*

*Primary Examiner* — Neha Patel
*Assistant Examiner* — Clay C Lee
(74) *Attorney, Agent, or Firm* — Bookoff McAndrews, PLLC

(57) ABSTRACT

Systems and methods are disclosed for payment transactions, alerts, dispute settlement, and settlement payments, using multiple blockchains. One method includes: entering, in a first blockchain, a transaction identifier indicating the initiation of and identification of a transaction; receiving an identifier of a currency or cryptocurrency account for participants of the payment transaction; performing one or more iterations of: identifying a new transaction event in the series of transaction events stored in the first blockchain; presenting the new transaction event to participants of the transaction, wherein the presentation enables a participant to indicate a dispute of an attribute of the transaction; relaying one or more attributes of the transaction to a second blockchain for processing the transaction; and receiving, from the second blockchain, an indication of a transfer of funds between the two or more participants, using the identifiers of the currency or cryptocurrency accounts of the two or more participants.

18 Claims, 10 Drawing Sheets

(56) References Cited

U.S. PATENT DOCUMENTS

| | | | |
|---|---|---|---|
| 2015/0170112 A1* | 6/2015 | DeCastro | G06Q 20/381 |
| | | | 705/39 |
| 2016/0254910 A1* | 9/2016 | Finlow-Bates | H04L 9/3268 |
| | | | 713/158 |
| 2017/0046693 A1* | 2/2017 | Haldenby | G06Q 20/102 |
| 2017/0109735 A1* | 4/2017 | Sheng | G06Q 20/3678 |
| 2017/0132626 A1* | 5/2017 | Kennedy | G06Q 20/065 |
| 2018/0075527 A1* | 3/2018 | Nagla | G06F 21/6218 |
| 2018/0144153 A1* | 5/2018 | Pead | H04L 9/3236 |
| 2019/0112050 A1* | 4/2019 | Ibrahim | G06F 9/453 |
| 2019/0116034 A1* | 4/2019 | Sengupta | H04L 9/30 |
| 2020/0068022 A1* | 2/2020 | Chow | G06Q 20/10 |

* cited by examiner

SYSTEMS AND METHODS FOR PAYMENT TRANSACTIONS, ALERTS, DISPUTE SETTLEMENT, AND SETTLEMENT PAYMENTS, USING MULTIPLE BLOCKCHAINS

FIELD OF DISCLOSURE

The present disclosure relates generally to the field of payment transactions and, more particularly, to payment transactions, alerts, dispute settlement, and settlement payments, using multiple blockchains.

BACKGROUND

In current payment transactions between consumers ("cardholders" or "users") and merchants, it may be common for merchants and/or the respective acquiring institutions ("acquirers") of the merchants to have a dispute over a term of the payment transaction with consumers and/or the issuing institutions ("issuers") of the consumers. Currently, the process for resolving these disputes may rely on the payment network as an intermediary for dispute resolution process. While this process ("network dispute resolution process") may be the current approach to resolve disputes and/or chargebacks between the cardholder and merchants, the process may be complicated, lengthy, and cumbersome for both the issuers, consumers, merchants, and/or acquirers. In the network dispute resolution process, the consumer (e.g., "cardholder") may initiate the dispute by contacting the consumer's issuer, and then the issuer may check for risk and/or fraud associated with the payment transaction and submit the dispute to the payment network. Subsequently, the payment network may dispatch the dispute/chargeback to the merchant for acceptance and/or representment.

In the event that the parties to the dispute (e.g., consumer, issuer, merchant, acquirer, etc.) cannot agree after several attempts at the network dispute resolution process, one of the parties may resort to arbitration, which may be an expensive process in which the payment network arbitrates and decides on liability. Thus, there is a desire for a system and method for enabling consumers and their issuers to resolve disputes with merchants and their respective acquirers in a dispute resolution process that is efficient and reduces costs for parties by working collaboratively outside the payment network in a manner that benefits the involved parties.

In using the payment network as an intermediary, the current network dispute resolution process is also cumbersome, lengthy, and dependent on the rules set by payment networks. Payment network specific dispute rules may cause costly charges to acquirers and merchants to comply with the frequent changes in payment networks or their rules. There may be an increase in fraudulent and invalid claims due to intermediaries in the process. Thus, there is also a desire for a dispute resolution process that is transparent and standardized, but which also reduces risks and incidents of fraud. This information could be used by the merchants to proactively stop the fulfillment of goods and services associated with fraudulent accounts at the time of the transaction. Additionally, there is a desire for a user interface system and method that may analyze various transaction information stored in the blockchain. Furthermore, since updates and/or changes to information within blockchains may not be automatically deliverable to interested parties, there is a desire for a system and method that delivers and/or processes information from blockchain, while updating the blockchain based on input from the interested parties.

Even further, it may be contemplated that participants of a transaction process may not want to share all information with other participants of a transaction. It may also be the case where there may be network of member participants that would accomplish a certain business or function of a transaction, whereas other networks may accomplish other business or function of the transaction. For example, while one network may be responsible for overseeing disputes, another network maybe responsible for the actual exchange of funds. These networks may also be required to comply, for example, with various regulations governing payment transaction. Thus there is a desire for system and methods described above that may be expanded to include multiple networks or blockchains, e.g., for different business or functions pertaining to a payment transaction, which comply with existing regulations and standards.

SUMMARY

According to certain aspects of the present disclosure, systems and methods are disclosed for payment transactions, alerts, dispute settlement, and settlement payments, using multiple blockchains.

In one embodiment, a computer-implemented method is disclosed for managing payment transactions, alerts, dispute settlement, and settlement payments, using multiple blockchains. The method comprises: entering, in a data entry of a first blockchain, a transaction identifier indicating the initiation of and identification of a transaction for a good or service originating at a merchant; receiving an identifier of a currency or cryptocurrency account for each of two or more participants of the payment transaction; performing one or more iterations of: identifying a new transaction event in the series of transaction events stored in the first blockchain for the payment transaction, using the transaction identifier, wherein a transaction event is a new transaction event if the transaction event has not been identified in a previous iteration; presenting the new transaction event to one or more participants of the transaction on a user interface, wherein the presentation enables a participant to indicate a dispute of one or more attributes of the transaction; relaying one or more attributes of the transaction to a second blockchain for processing the transaction; and receiving, from the second blockchain, an indication of a transfer of funds between the two or more participants, using the identifiers of the currency or cryptocurrency accounts of the two or more participants.

In accordance with another embodiment, decentralized computer systems are disclosed for managing payment transactions, alerts, dispute settlement, and settlement payments, using multiple blockchains. The system comprises: a data storage device storing instructions for managing payment transactions, alerts, dispute settlement, and settlement payments, using multiple blockchains; a user interface; and a processor configured to execute the instructions to perform a method including: entering, in a data entry of a first blockchain, a transaction identifier indicating the initiation of and identification of a transaction for a good or service originating at a merchant; receiving an identifier of a currency or cryptocurrency account for each of two or more participants of the payment transaction; performing one or more iterations of: identifying a new transaction event in the series of transaction events stored in the first blockchain for the payment transaction, using the transaction identifier, wherein a transaction event is a new transaction event if the transaction event has not been identified in a previous iteration; presenting the new transaction event to one or more participants of the transaction on a user interface, wherein the presentation enables a participant to indicate a dispute of one or more attributes of the transaction; relaying one or more attributes of the transaction to a second blockchain for processing the transaction; and receiving, from the second blockchain, an indication of a transfer of funds between the two or more participants, using the identifiers of the currency or cryptocurrency accounts of the two or more participants.

In accordance with another embodiment, a non-transitory machine-readable medium is disclosed that stores instructions that, when executed by a blockchain interface server, causes the blockchain interface server to perform a method for managing payment transactions, alerts, dispute settlement, and settlement payments, using multiple blockchains. The method includes: entering, in a data entry of a first blockchain, a transaction identifier indicating the initiation of and identification of a transaction for a good or service originating at a merchant; receiving an identifier of a currency or cryptocurrency account for each of two or more participants of the payment transaction; performing one or more iterations of: identifying a new transaction event in the series of transaction events stored in the first blockchain for the payment transaction, using the transaction identifier, wherein a transaction event is a new transaction event if the transaction event has not been identified in a previous iteration; presenting the new transaction event to one or more participants of the transaction on a user interface, wherein the presentation enables a participant to indicate a dispute of one or more attributes of the transaction; relaying one or more attributes of the transaction to a second blockchain for processing the transaction; and receiving, from the second blockchain, an indication of a transfer of funds between the two or more participants, using the identifiers of the currency or cryptocurrency accounts of the two or more participants.

In some embodiments, the non-transitory machine readable medium may be embedded into various nodes of the blockchain.

Additional objects and advantages of the disclosed embodiments will be set forth in part in the description that follows, and in part will be apparent from the description, or may be learned by practice of the disclosed embodiments. The objects and advantages on the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

DETAILED DESCRIPTION

Figure 1:
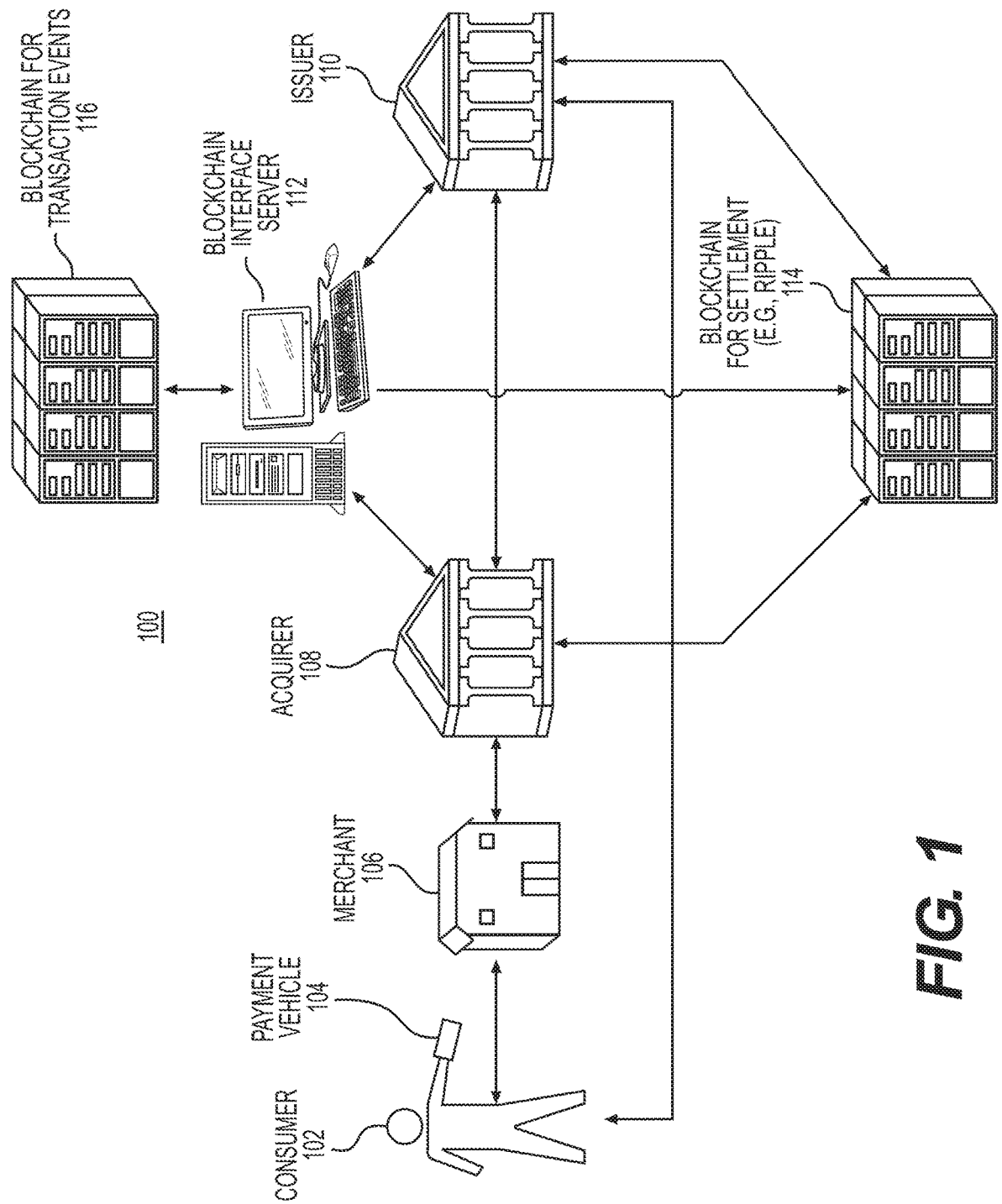
FIG. 1 depicts an environment of the payment transactions, alerts, dispute settlement, and settlement payments, using multiple blockchains, in accordance with non-limiting embodiments.

Various non-limiting embodiments of the present disclosure will now be described to provide an overall understanding of the principles of the structure, function, and use of systems and methods disclosed herein for payment transactions, alerts, dispute settlement, and settlement payments, using multiple blockchains.

As described above, existing methods of resolving disputes in payment transactions, which use the payment network as a mediator, have proven to be complicated, lengthy, and cumbersome for issuers, consumers, merchants, and/or acquirers. Parties to a payment transaction may be burdened with making costly changes by having to comply with the frequent changes in payment networks and the rules used by the payment networks for resolving disputes. Furthermore, in replacing conventional payment networks, blockchain networks may need to comply with standards and regulations set for the payment industry. It is also contemplated that some participants in the business of or related to a payment transaction may not want to share all information or be privy to other participants in the business of or related to the business transaction. Therefore, there may be a need for multiple networks involved in the payment transaction process for various business or functions. Each network may have its own blockchain with member participants, and the blockchain networks may communicate with one another, for example, using inter ledger communication protocol.

Thus, the embodiments of the present disclosure are directed to a system and method for enabling consumers and their issuers to resolve disputes with merchants and their respective acquirers in a dispute resolution process that is efficient, transparent, and standardized (e.g., to account for multiple payment networks), reduces costs for parties, complies with existing regulations, minimizes risks and incidents of fraud, and processes a payment transaction, using multiple blockchains. In some embodiments, one blockchain may be responsible for functions of storing transaction information used for alerts and dispute settlements, whereas another blockchain (e.g., Ripple) may be used for the function of actually exchanging currency or cryptocurrency (e.g., Bitcoins, Litecoins, etc.) for the processing of the transaction. In various embodiments, a blockchain may refer to an open, distributed ledger (e.g., "shared permissioned ledger") that can record transactions between parties to a payment transaction efficiently and in a verifiable and a permanent way (e.g., by providing visibility or by being transparent to various participants of the blockchain). A blockchain may be operated by many different parties that come to share consensus. It may maintain a growing list of ordered records, called blocks. Each block may have a timestamp and a link to a previous block. Records may not be altered retroactively. A common analogy for a blockchain may be a digital network of safety deposit boxes. These boxes can secure any digital asset (e.g., currency, securities, loyalty points, contracts). Each box is locked with a crypto private key. The owner of the box can use their key to unlock the box and push a digital asset to another safety deposit box that is secured by the keys of the recipient. The recipient can then retrieve the digital asset from their safety deposit box.

A blockchain may include one or more of the following features. In some embodiments, a blockchain may include a database, and tabular schemes may be used to encode core data types on top of a traditional database. In such embodiments, tables may consist of blocks, which may be bundles of transactions. Furthermore, such embodiments may be configured so that blockchain transactions may be all or nothing. A blockchain may be rendered immutable, ensuring that the data stored in a block cannot be changed. Each block in the chain may include reference to the previous block, so in chains with a high rate of new transactions, the block may be securely linked to previous blocks. The block may also be replicated numerous times. Cryptography may ensure that users of a blockchain may only edit the parts of the blockchain that they "own" by possessing the private keys necessary to write to the file. Cryptography may also ensure that copies of the distributed blockchain are kept in sync. Distributed ledgers ("shared ledgers") may be used for transaction integrity. Thus, ledgers may be maintained by multiple independent entities on different computing devices. A consensus protocol may be followed by each entity to maintain a consistent view of the ledger. Distributed ledgers provide for greater resiliency against malicious attacks or system failures. Furthermore, a blockchain may be "permissioned"—e.g., allow access to only a specific set of participants. It is contemplated that it may be useful for financial applications to use distributed, centralized, permissioned, tokenless ledgers as a basis for the implementations of various systems and methods presented herein.

In some embodiments, a different blockchain network may be used for the processing of a payment transaction that may involve an exchange of funds, currencies, and/or cryptocurrencies, For example, this blockchain network may be based on Ripple, which is a real-time gross settlement system (RTGS), currency exchange and remittance network enabling secure, instant, and cheap global financial transactions with no chargebacks. Ripple may support tokens representing fiat currency, crypto, currency, crypto currency, commodity, etc. Ripple may be based around a shared public blockchain and/or shared ledger, which may use a consensus process that may allow for payments to occur in a decentralized, distributed process.

In various embodiments of the present disclosure, "currency" may be used to refer to both fiat currency (e.g., dollars, pounds, euro, yen, rupees, etc.) or digital currency (e.g., bitcoins, Litecoins, etc.)

Thus, various parties of a transaction (e.g., consumers, issuers, merchants, acquirers, etc.) may be a part of the Ripple network to be able to leverage this settlement system. In such embodiments, blockchain networks used for the processing of the payment transaction, like Ripple, may be designed to comply with risk, privacy and compliance requirements and specifically designed for financial services industry with a number of banks/financial institutions already in the network.

While Ripple is used as an example blockchain network or platform to serve the function of the settlement or transfer of funds, currency, ad/or cryptocurrency, it is contemplated that similar blockchain networks that provide the benefits described above may be used.

The use of blockchain may have a long term impact on the financial services industry in paring down transaction settlement time from days to minutes and minimizing the need for intermediaries. Furthermore, it may enable point to point exchanges of digital assets without a need for trust between the parties in the exchange. This may reduce the need for third party engagement in transactions and may reduce the cost involved in verifying a transaction.

As applied to at least some embodiments presented herein, a blockchain having a shared permissioned ledger may be available to participants and may provide visibility to the participants of the blockchain, which may be the parties of a payment transaction initiated by a consumer and originating at a merchant. These parties may include, but are not limited to, the consumer, the merchant at which the transaction originates, the merchant's acquiring bank or institution, and the issuing institution or bank of the consumer. The ledger of one or more of the blockchain networks may be programmed to trigger transactions or resolve disputes based on the payment transaction automatically (e.g., via Smart Contracts). Thus, the use of blockchains for e.g., record keeping and dispute resolution of payment transactions ("blockchain for transaction information"), a settlement or exchange of funds or currency ("blockchain for settlement"), or for various other functions may result in efficiencies, reduced chargebacks, efficient allocation of resources, and reduction in costs for both issuers and merchants. Furthermore, the blockchains may be interlinked, for example, via a partially or fully shared ledger, or a means of communicating necessary information for a transaction in a secure way (e.g., "inter ledger communication" protocol).

For example, the blockchain for transaction events records various events of a transaction. The participants of the transaction may dispute the data for one or more transaction attributes, and the blockchain for transaction events may be used to for retrieving information to resolve the dispute (e.g., using a Smart Contract API from a blockchain interface server). However, if the blockchain for transaction events successfully resolves a dispute (e.g., if the parties to the dispute agree with or do not contest with the results of the blockchain dispute resolution), the blockchain for settlement may duly process and record the appropriate exchange of funds between the parties of the transaction.

In some embodiments, if a blockchain dispute resolution process (involving the blockchain for transaction information) is unsuccessful in resolving a dispute (e.g., if one or more of the parties to the dispute indicate that they do not agree with the result of the blockchain dispute resolution) the payment network may take over in handling the dispute (e.g., via the traditional network dispute resolution process, referred to as "payment network dispute resolution" herein). Nevertheless, the blockchain dispute resolution process may be able to help address a large proportion of the disputes and/or chargebacks of payment transactions without the network intermediary, for example, if there exists a degree of trust between the participants in the dispute (e.g., consumers, issuers, merchants, acquirers, etc.).

It is contemplated that the blockchain dispute settlement process may reduce the need for payment network dispute settlement, and thereby reduce the need for maintaining two dispute settlement systems for a potential dispute. In some embodiments, it is also contemplated that any dispute settlement may be confined to the blockchain dispute settlement process, e.g., to reduce the cost of having to maintain more than one dispute settlement systems.

In some embodiments, the participants of the dispute may be represented as nodes of a blockchain and/or may be able to access and/or contribute to the blockchain. Unlike network dispute resolution process, which may rely on a centralized authority (e.g., a payment network), a blockchain dispute resolution process, e.g., as described by various embodiments of the present disclosure, may facilitate a transparent, rules-based, communication process to possibly reduce costs for both merchants and acquirer, using one or more blockchains (e.g., the blockchain for transaction events and the blockchain for settlement).

The types of blockchain systems used for dispute management for payment transactions may include, for example, public blockchains, private blockchains, a hybrid form of a public and private blockchain (e.g., a consortium blockchain or hyperledger blockchain), or a ripple blockchain as described above (e.g., for the exchange of funds for the processing of a transaction). In a consortium blockchain, the consortium may include and be accessible to the participants of the blockchain (e.g., consumers, issuers, merchants, and/or acquirers of a payment transaction). A consortium blockchain may proffer the benefits of setting control of the rules for dispute settlement within the bounds as agreed upon by the participants. Thus, the rights to read and/or access the blockchain may be restricted to different participants, based on individual classes or identities of the participants. In some embodiments, a blockchain interface server would periodically or continually read and/or access the blockchain to provide posted information to interest parties (e.g., consumer, merchant, issuer, acquirer, etc.). Allowing the blockchain interface server to act as an intermediary between the blockchain and the participants may ensure, for example, the protection of private information. The blockchain interface server may also add to the blockchain based on the input of the interested parties.

In some embodiments, the participants of a blockchain, prior to joining the blockchain, may be vetted, and hence may not be anonymous participants. Vetting may reduce the risk of any form of malicious attacks on the blockchain. In other embodiments, the new entrants to a blockchain may be restricted to those known by other known participants of the blockchain. These blockchains (e.g., a consortium blockchain) may significantly reduce the risks of attacks that are prevalent, for example, in public blockchains (e.g., 51% attack). The risks may be significantly reduced due to restrictions placed on the entry of new members. The transactions may resemble the "colored pin" approach of transferring ownership to different participants in the blockchain. It may also be efficient to use certain blockchains (e.g., consortium blockchains) due to the limited number of nodes that may need to be updated and the limited role of verifying the blocks before those are appended to the blockchain. The members or participants of the blockchain may be represented as nodes of the blockchain. In some embodiments, for example, where the nodes may be "trusted" and/or be well connected, a blockchain may enable the nodes to easily spot and/or fix any failures or inconsistencies of the blockchain. For example, in a consortium blockchain, payment transactions and/or dispute resolution processes caused by the payment transactions may be many degrees cheaper compared to their implementation on a public blockchain. Additionally or alternatively, a blockchain may be used that may provide flexibility to develop on the blockchain infrastructure. For example, a hyperledger may be specifically built to expand to other non-traditional use cases of the blockchain. Since verification may be needed by a comparatively larger number of nodes in the public blockchain as compared to a consortium or private blockchain, a public blockchain may require a higher level of computational power than a consortium or private blockchain.

It may also be useful to use certain blockchains (e.g., Ripple) for specific functions like a settlement or exchange of funds, because such blockchains may be designed to satisfy risk, privacy, and compliance requirements and/or may be specifically designed for the financial services industry with a number of banks and/or financial institutions already in the network.

In some embodiments, the blockchain dispute resolution process may involve a Smart Contracts application. In various embodiments, "Smart Contracts" may refer to a computerized transaction protocol that facilitates, verifies, and/or enforces the negotiation or performance of a contract (e.g., as the one governing a payment transaction between the issuer and the merchant or merchant's acquirer). A Smart Contract may satisfy common contractual conditions (e.g., payment terms, liens, confidentiality, enforcement, etc.), reduce malicious and/or accidental exceptions, and/or reduce the need for trusted intermediaries. Different types of algorithms may be employed to offer finality (e.g., of a contract) in a shorter timeframe. Various rules for initiating or managing the dispute settlement between parties can be "codified" into the smart contract between the participants. In some embodiments, once the rules have been "codified" into the blockchain, the rules of the Smart Contracts may be rendered or configured to be final and/or immutable during its execution of the Smart Contract. Furthermore, the blockchain may serve as an audit trail for the resolution of disputes among the participants, should questions arise as to the dispute settlement process.

For example, the blockchain dispute resolution process may be governed and/or at least initialized using Smart Contracts. Participants of the dispute resolution process (e.g., consumers, issuers, merchants, acquirers, etc.,) may establish the underlying attributes of the contract governing the payment transaction, or the underlying rules of the dispute resolution process. Smart Contracts may then proceed to execute the payment transaction based on the underlying attribute values or facilitate the dispute resolution process using the underlying rules.

In some embodiments, cryptographic assurances may be available to the participants. Any documents may be captured and securely stored by the blockchain, for example, in an off-the-blockchain storage (e.g. NoSQL database), for retrieval by the other party. Identifiers to these documents may be stored in the blockchain. These documents may include, for example, receipts of purchases, identification information of the consumer, merchant, issuer, or acquirer, available funds or resources, geographical information, or temporal information.

In further embodiments, user interface systems and methods are disclosed for analyzing the various data stored in the blockchain. The various data may include information regarding a specific attribute(s) of a transaction (e.g., other transactions that share the same attribute(s)). In some embodiments, one or more of the specific attribute(s) that is being analyzed may be in dispute in the original transaction. The attributes may include, for example, a party to the transaction or transaction dispute, and such embodiments may also be able to provide analytical data on that party (e.g., transaction history of that party, incidents of fraud that resulted from that party, etc.)

One or more examples of these non-limiting embodiments are illustrated in the selected examples disclosed and described in detail with reference made to FIGS. 1-3 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

FIG. 1 depicts an illustration of the environment of the payment transactions, alerts, dispute settlement, and settlement payments, using multiple blockchains, in accordance with non-limiting embodiments. At a high level, the environment comprises: a consumer 102 equipped with a payment vehicle 104 from an issuing bank or institution, i.e., "issuer" 110; a merchant 106 with an acquiring bank or institution, i.e., "acquirer" 108; a server or computing system that manages or is involved with the payment transactions, alerts, dispute settlement, and settlement payments of the various blockchain networks ("blockchain interface server" 112); and a plurality of blockchains, e.g., a blockchain for transaction events 116, and a blockchain that is involved with the actual transfer of funds, currency or cryptocurrency ("blockchain for settlement" 114). To emphasize the existence of a network of nodes or member participants of a blockchain, "blockchain network" may be used in lieu of blockchain throughout this disclosure. It is contemplated that the blockchain dispute settlement process described herein may eliminate the need for a payment network server that was traditionally used for settling disputes. In various embodiments of the present disclosure, the acquirer 108 and the issuer 110 may also refer to the computing system or server of the acquirer 108 or issuer 110, respectively.

Various embodiments of the present disclosure may involve consumer 102 conducting a payment transaction with merchant 106 using a payment vehicle 104, e.g., a credit card, debit card, mobile device, a bitcoin or Litecoin account ID or card, or the like. It will be appreciated by those of skill in the art that consumer 102 may present payment vehicle 104 at a POS terminal of merchant 106 to initiate a payment transaction. However, in some embodiments, there may be an online portal of a merchant for the consumer to initiate a payment transaction in lieu of a physical POS terminal. Upon initiation of the payment transaction by a consumer, the merchant and/or the POS terminal of the merchant may transmit transaction information to the acquirer 108 of the merchant. The transaction information may include, for example, information identifying the issuer 110 of the payment vehicle 104 of the consumer 102, or information identifying a cryptocurrency (e.g., bitcoin, Litecoin, etc.,) account of the consumer 102 or the issuer 110. The acquirer 108 may transmit the transaction information to the issuer 110, and request payment of funds, in accordance with the terms of the transaction.

The issuer 110 may dispute one of the terms of the transaction, e.g., the amount of funds required, the type of purchase made, the payment vehicle used, etc. If there is a disagreement between the acquirer 108 (or merchant 106) and the issuer 110 (or consumer 102) as to the terms of the transaction, one or more of the disputants (e.g., acquirer, issuer, merchant, or consumer) may relay information related to the dispute ("dispute information") to the blockchain interface server 112. The dispute information may be encrypted and entered into a blockchain where the disputants may be members (e.g., nodes), and therefore may be able to read and/or access each block of the blockchain. The blockchain interface server 112 may attempt to resolve the dispute using at least some of the methods described in the present disclosure. The blockchain interface server 112 may present the dispute resolution to the disputants (e.g., acquirer, merchant, issuer, consumer, etc.). The dispute resolution may itself be another entry into the distributed ledger of one or more blockchains (e.g., the blockchain for transaction events), which the members of the blockchain may be able to read and/or access. Furthermore, the blockchain interface server 112 may facilitate communication between the blockchain for transaction events and blockchain for settlement 114 (e.g., Ripple) for immediate settlement of payment. In some embodiments, if one or more of the disputants do not agree with the dispute resolution presented by the blockchain interface server, the dispute information may be relayed to a payment network server to resolve the dispute through conventional dispute settlement processes. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

Figure 2:
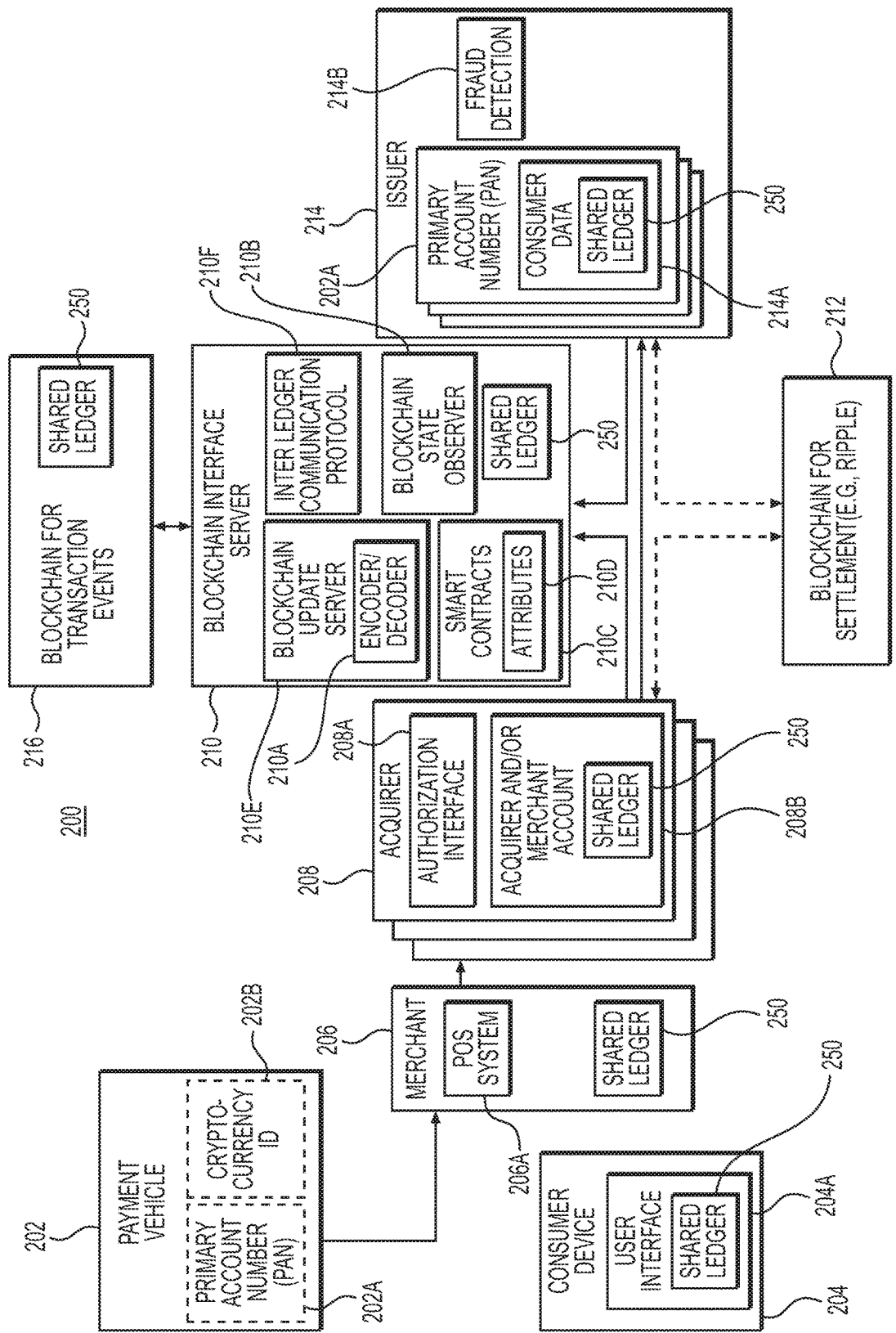
FIG. 2 depicts a block diagram of an example network of the payment transactions, alerts, dispute settlement, and settlement payments, using multiple blockchains, in accordance with non-limiting embodiments.

FIG. 2 depicts a block diagram of an example network 200 of the payment transactions, alerts, dispute settlement, and settlement payments, using multiple blockchains, in accordance with non-limiting embodiments. Specifically, the network may include the payment vehicle 202 of a consumer, a consumer device 204 of a consumer, the merchant 206, the acquiring institution or computing system ("acquirer" 208), a server ("blockchain interface server") 210 that may manage payment transactions, alerts, and disputes, by observing and/or updating one or more blockchains, an issuing institution or computing system ("issuer" 214), and one or more blockchain networks performing various functions or playing various roles related to a payment transaction. The one or more blockchain networks may include, for example, a blockchain ("blockchain for transaction events" 216) for storing transaction information that can be retrieved by blockchain interface server 210 to trigger alerts or disputes (e.g., a consortium blockchain) and a blockchain ("blockchain for settlement" 212) that is used in the processing of the transaction involving the transfer of funds and/or record keeping of the exchange of a currency or crypto currency. In one embodiment, the Ripple blockchain may be used as the blockchain for settlement. It is contemplated, however, that in some embodiments, the blockchain dispute settlement process involving the multiple blockchains may reduce the need for payment network servers that are conventionally used in resolving disputes.

The payment vehicle 202 may be linked with a financial account of resources or funds defined by a primary account number ("PAN") 202A. In one embodiment, the PAN may identify one or more payment source accounts of the consumer, issued or established by a given issuer 214. Alternatively or additionally, the payment vehicle 202 may be linked with a financial account of cryptocurrency resources or funds (e.g., bitcoin, Litecoin, etc.,) defined by cryptocurrency identification (ID) 202B. In one embodiment, the PAN or cryptocurrency ID may identify one or more payment source accounts of the consumer, issued or established by a given issuer 214. Unless otherwise specified herein, a payment vehicle may include a physical card including a plastic or metallic card having a magnetic stripe, bar code, or other device or indicia indicative of an account number or other account information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. It is also contemplated that the payment vehicle 202 may have multiple embodiments or forms. For example, payment vehicle 202 can be a physical card (e.g., in the form of magnetic striped plastic card), a virtual card (e.g., in the form of a display on a smart phone), or both. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number (e.g., PAN) associated with the card. Alternatively, the virtual card may have display elements relating to the merchants that accept the card.

A consumer, sometimes referred to as the end user, a cardholder, or a card member, may provide identifying information, e.g., via the PAN 202A or cryptocurrency ID 202B of the user, to the POS system 206A of the merchant 206 to initiate a transaction with merchant 206 using the consumer's payment vehicle 202 (e.g., an enrolled credit card). In some cases, the consumer may use a computing device or mobile device ("consumer device" 204) to initiate the transaction, such as for a card-not-present transaction at an online merchant. Thus, payment vehicle 202 may enable the consumer to initiate a transaction with merchant 206 using the payment source associated with the issuer 214 that issued the payment vehicle 202 to the consumer. A consumer may also use the consumer device 204 to oversee, manage, or access details regarding a payment transaction via user interface 204A. Transaction details may be accessible to the consumer via a shared ledger 250, which the consumer may access via the user interface 204A of consumer device 204. The shared ledger may have information shared by one or more of the blockchains, depending on the extent to which each blockchain network is designed or configured to share with the specific end user (e.g., consumer, merchant, acquirer, issue, etc.) Thus, during a dispute settlement process mediated by the blockchain interface server 210, a consumer may view the results of a dispute settlement process posted on the shared ledger 250 using the user interface 204A of consumer device 204. In some embodiments, the blockchain interface server 210 may periodically or continually retrieve the latest data of stored in one or more of the blockchains and/or shared ledger of one or more of the blockchains, and then make it accessible to interested parties (e.g., consumer via user interface 204A, merchant 206, acquirer 208, issuer 214, etc.). It is contemplated that in some embodiments, transaction information (e.g., merchant, consumer, transaction amount, good or service, etc.) stored in the blockchain for transaction events 216 would be made accessible by blockchain interface server 210 to interested parties (e.g., consumer, merchant, issuer, acquirer, etc.,), whereas account balance information of various parties that are stored, for example, in the blockchain for settlement 212 (e.g., Ripple) may not be as easily accessible due to privacy concerns. The blockchain interface server 210 may need to decode entries stored in the one or more blockchain networks, via encoder/decoder. A consumer may also use the consumer device 204 to initiate a dispute and/or have a computing system of issuer 214 initiate a dispute based on information presented via user interface 204A.

In various embodiments described herein, a merchant 206 may refer generally to any type of retailer, service provider, or any other type of business that is in networked communication with the computing system of an acquiring institution or bank ("acquirer" 208) and uses the payment processing services of acquirer 208. Payment processing services may include receiving and responding to authorization requests as well as facilitating the settlement of funds associated with card-based transactions occurring at merchant 206. In some embodiments, as described herein, the acquirer 208 may use the blockchain interface server 210 to facilitate the settlement of funds (e.g., using blockchain for settlement 212) associated with the card-based transactions occurring at merchant 206. A merchant 206 may have one or more POS systems 206A. In various embodiments described herein, a POS system 206A may refer broadly to include POS systems at brick and mortar locations and "virtual" POS systems that can be associated with online retailers or "in-app" purchases. In some cases, a POS system 206A may include a physical terminal, or other network computing system used to facilitate a payment transaction at a location of merchant 206. Each POS system 206A may be generally unmodified or "stock" and simply facilitate the standard transmission of transaction-related information to the acquirer computing system 208, as is known in the art. The transaction-related information may comprise a transaction authorization request ("authorization request"), including but not limited to, a payment amount, a date, a time, a primary account number, as well as other types of identifying indicia (e.g., merchant identification). The identifying indicia may vary based on POS system 206A, the type of merchant, and the type of transaction, but example types of identifying indicia may include any of the following: an alternative identifier to the primary account number of the user; a user's name or other user identifier; a merchant identification (MID) identifier; a merchant category code (MCC) identifier; a media access control (MAC) identifier; an internet protocol (IP) identifier; a geographic identifier; and/or a payment type identifier. In some embodiments, as described herein, a merchant 206 may also be able to oversee, manage, and/or access details regarding a payment transaction originating at the merchant 206, via a shared ledger 250. For example, during a dispute settlement process mediated by the blockchain interface server, a merchant may view the results of a dispute settlement process posted on the shared ledger 250. In other embodiments, the blockchain interface server 210 may periodically or continually retrieve the latest data of stored in blockchain for transaction events 216 and/or its shared ledger, and then make the latest data accessible to interested parties (e.g., consumer via user interface 204A, merchant 206, acquirer 208, issuer 214, etc.). In such embodiments, the blockchain interface server 210 may need to decode entries stored in the blockchain 216, via encoder/decoder. A merchant 206 may also initiate a dispute and/or have the acquirer computing system 208 initiate a dispute, and have the blockchain interface server 210 facilitate the dispute.

Referring now to acquirer computing system 208, authorization interface 208A may receive a transaction authorization request from POS system 206A of merchant 206. The authorization request may comprise various data, including, for example, a MID, a MCC, the cardholder's primary account number 202A or cryptocurrency ID 202B, and a transaction amount, among other things. In some embodiments, acquirer computing system 208 may also receive other consumer-identification related data, e.g., an email address, an IP address, etc. In yet another embodiment, the transaction authorization request detail may contain identifying information about the merchant. Once the authorization request is received, acquirer computing system 208 may transmit the transaction authorization request, including the amount of funds required for the transaction ("transaction amount") and the primary account number 202A of the user, received from POS system 206A, to blockchain for settlement 212 for further processing of the payment transaction. In some embodiments, a component of acquirer computing system 208 (e.g., authorization interface 208A) may also transmit data identifying the acquirer (e.g., the identifying information of the acquirer bank, for example, the acquirer's cryptocurrency ID) to blockchain for settlement 212. In other embodiments, a merchant 206 may directly transmit the payment authorization request to blockchain for settlement 212 for further processing of the payment transaction.

It is also contemplated that in some embodiments, the settlement of funds and further processing of the transaction by blockchain for settlement 212 is facilitated by blockchain interface server 210. In such embodiments, once the authorization request is received, acquirer computing system 208 may transmit the transaction authorization request, including the amount of funds required for the transaction ("transaction amount") and the primary account number 202A or cryptocurrency ID 202B of the user, received from POS system 206A, to blockchain interface server 210.

Still referring to FIG. 2, once the transaction authorization request is delivered to blockchain interface server 210, the blockchain interface server may store transaction information of the transaction authorization request into a blockchain (e.g., "blockchain for transaction events" 250) and/or its shared ledger. Transaction information of the transaction authorization request, by way of being stored in the blockchain and/or shared ledger may be accessible to interested parties (e.g., consumer, issuer, merchant, acquirer, etc.) or may be made accessible by the blockchain interface server. By viewing various transaction information, an interested parties may be able to contest an entered data for one or more transaction attributes. In some embodiments, the blockchain interface serve may be able to enter the claims of the disputants into one or more blockchains as to what each disputant believes is the correct data entry for a transaction attribute. The blockchain interface server may facilitate a dispute resolution process using, for example, Smart Contracts 210C.

If no parties dispute the published and/or accessible transaction information, the transaction authorization request may be processed at blockchain for settlement 212A. In some embodiments, the blockchain interface server may relay the transaction authorization request and/or facilitate communication between blockchain for transaction events 216 and blockchain for settlement 212 using electronic communication channels for communication between blockchain networks (e.g., "inter ledger communication" protocol 210F). An example of blockchain for settlement 212A includes but is not limited to real-time gross settlement systems (RTGS), like Ripple, which facilitate currency or cryptocurrency exchange and remittance via a network. Such blockchain networks may enable secure instant and nearly free global financial transactions of any size with no chargebacks, and may support tokens representing fiat currency, cryptocurrency, commodities etc. It is also contemplated that such blockchain networks, like Ripple, would be designed to comply with risk, privacy and compliance requirements and specifically designed for financial services industry with a number of banks/financial institutions already in the network. Thus, issuer 214 and acquirer 208 may be a part of the network comprising the blockchain for settlement 212. Thus the blockchain for settlement 212 may record the funds extracted from one or more of the consumer, merchant, acquirer, or the issuer.

Additionally or alternatively, the transaction authorization request may be processed according to methods known to those having ordinary skill in the art. For example, payment network server, may store the transaction related information and route the payment authorization request to the issuer to request funds to complete the transaction. In some embodiments, the payment network server may also extract funds from one or more of the merchant, acquirer, or the issuer, for the payment network that serves as an intermediary for the transaction. Traditionally, when disputes arise concerning information of a payment transaction, the payment network used for the payment transaction provides a means for the dispute resolution ("payment network dispute resolution"). Often during the payment network dispute resolution, a server, application, or department of one of the various entities described in FIG. 2 (e.g., fraud detection 214B of issuer 214) may investigate the payment transaction for possible fraud. In some embodiments, the participants of the dispute may resort to the payment network server for resolving disputes if the participants cannot agree to the results of a dispute resolution process mediated by blockchain interface server 210 ("blockchain dispute resolution") using one or more of the blockchains. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In various embodiments described herein, an issuer 214 may refer to an institution or organization that issues a payment vehicle 202 to the consumer or to the computing system of the institution or organization. The issuer 214 may enable the consumer to use funds from a payment source and/or cryptocurrency held by or managed by the issuer. For example, the issuer 214 may be the bank of the consumer, which stores the consumer's checking and savings account. In some embodiments, an issuer may utilize an issuer computing system to receive and transmit various transaction-related information (e.g., receive transaction authorization request from the acquirer). After receiving a transaction authorization request, an issuer may use the primary account number (PAN) 202A associated with the transaction authorization request to locate data regarding a consumer ("consumer data" 214A). The consumer data 214A may include, for example, the account balance of the consumer, and/or a designated account to be used for the transaction. In one embodiment, at least some of the consumer data as it pertains to a payment transaction may be stored in a shared ledger 250 of one or more blockchains, where the participants of the blockchain include the parties involved in the payment transaction (e.g., consumer, merchant, issuer, acquirer, etc.). In some embodiments, the transaction authorization request made by the acquirer may itself be a block in one or more blockchains, accessible to the issuer (and other participants of the blockchain) on the shared ledger 250. In some embodiments, the blockchain interface server 210 may assist in the storage of fraud information related to current and/or or prior transactions related to the consumer, merchant, issuer, and/or acquirer. In such embodiments, before a transaction authorization request is initiated, a participant of the blockchain (e.g., acquirer) may check the blockchain interface server 210 for any records of fraud related to the PAN, cryptocurrency ID, or identifying information related to a party of the transaction, and then may deny the transaction (e.g., based on possibilities of fraud). The issuer, 214, using, fraud detection 214B, may be useful in providing fraudulent data to the blockchain interface server 210 so that parties to a transaction may collaboratively resolve a dispute, should a dispute arise. In some embodiments, the blockchain interface server 210 may store the fraud information into one or more blockchains (e.g., blockchain for transaction information 216), and may retrieve the information, e.g., upon request by an interested party.

Once the funds are withdrawn, a new entry may be published in the blockchain for transaction events 216 by the blockchain interface server 210 (e.g., via encoder/decoder 210A) to signify, for example, that a fund transfer was completed. Additionally or alternatively, the blockchain interface server 210 (e.g., via encoder/decoder 210A)may publish in the ledger of the blockchain for settlement 216, and/or cause the ledger of the blockchain for settlement 216 to reflect, new account balances for one or more parties to the transaction as a result of the exchange of the currency or cryptocurrency involved. In some embodiments, the blockchain interface server 210 may periodically or continually observe one or more of the blockchains and inform the participants of the blockchain of the new entry. In one embodiment, the blockchain interface server 210 directs its observation at the blockchain for transaction events 216, which may function as a record keeper for the various "events" of a transaction process. The blockchain for settlement 212 (e.g., Ripple) may function as a master record keeper of account balances and fund transfers for its various member participants. In other embodiments, the participants of the blockchain (e.g., merchant, acquirer, consumer, issuer, etc.) may be informed of new entries into the one or more blockchains directly, e.g., via the shared ledger 250. In further embodiments, while the shared ledger of the blockchains may be accessible to all participants of the blockchain, the blockchain interface server 210 may assist in decoding information within the shared ledger and/or in otherwise making the information of the shared ledger more accessible or understandable to the participants of the blockchain. For example, as will be described in FIGS. 5A-5B, 6, and 7, the blockchain interface server may present the information using data analytics and Smartbots.

After any block providing information regarding one or more attributes of a payment transaction has been published in a blockchain (e.g., blockchain for transaction events 216), one or more participants of the blockchain may dispute the accuracy of the information presented. Thus, a dispute may be initiated by one or more participants of the blockchain at any point in the payment transaction process.

The blockchain interface server 210 may oversee the dispute resolution process when one or more participants of the blockchain disputes any data about an attribute of the payment transaction ("transaction information") posted on the shared ledger 250. The attributes may include, but are not limited to: the identity of the merchant, consumer, acquirer, or issuer of the payment transaction; the transaction amount; an itemization and description of the goods and/or services transacted for; any geographical and/or temporal information of the payment transaction; any taxes, any tips, any discounts; any fees directed towards acquirers, issuers, payment networks; currency exchange rates; etc. In some embodiments, any data (e.g., value, name, etc.) for an attribute of the transaction information posted to a blockchain may be encrypted using encoder/decoder 210A, for example, to provide security and/or protect sensitive information. Data stored for these attributes may be quantitative (e.g., an amount) and/or qualitative (e.g., name of merchant). In some embodiments, metadata may also be stored. A blockchain update interface 210B may be one or more of an application, application program interface, software, hardware, server, or protocol that allows the addition of data (e.g., a new attribute or a detail regarding an attribute for the payment transaction or dispute, a proposed modification of the attribute by a disputing party, etc.) to a blockchain and/or shared ledger 250. In some embodiments, the blockchain update interface 210B may respond to input to add data to a blockchain and/or shared ledger by having the encoder/decoder 210A to encrypt the data before it is added into the blockchain. In other embodiments, the encoder/decoder 210A may also serve the functions of and/or be used in lieu of a blockchain update interface 210G. Thus, blockchain update interface 210G and/or an encoder/decoder 210A may respond to requests to add attributes of a payment transaction, dispute one or more of the previously posted data for a transaction attribute (e.g., by entering into a blockchain an indication of the dispute), and/or add a proposed modification to an existing transaction attribute (e.g., for initiating a dispute) or to a data of an existing transaction attribute.

A blockchain state observer 210C may enable the search, access or retrieval of data for any attribute of the transaction information (or data stored for the attribute) from the shared ledger 250 and/or blockchain for transaction events 216. For example, a blockchain state observer 210 may periodically (e.g., every second, minute, 10 minutes, hourly, daily, etc., or continuously retrieve the latest updates made to the blockchain for transaction events 216 and present it to participants of the blockchain e.g., by decoding information via encoder/decoder 210A, or by utilizing data analytics to make the information more understandable or relatable. In some embodiments, the frequency at which blockchain state observe 210 retrieves the information may depend on the nature of the notification. For example, if there is a need for near-real-time settlement, then the frequency may be less than an hour. Otherwise, the frequency of the retrieval may be less frequent.

Figure 4:
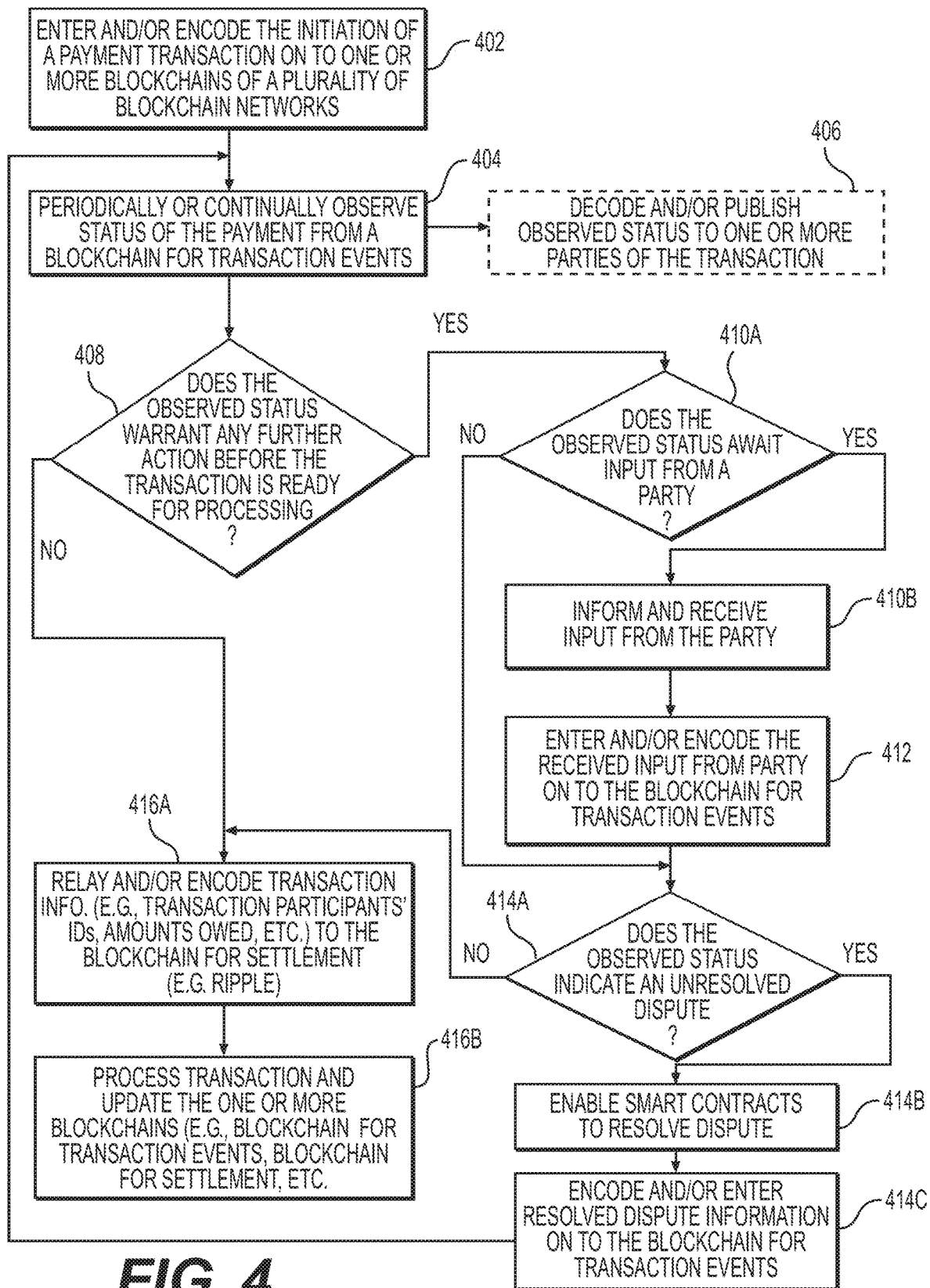
FIG. 4 depicts a block diagram of a general method for processing and executing upon information received by a blockchain interface server from multiple blockchains, in accordance with a non-limiting embodiment.

Based on the information received from the blockchain for transaction events 216, the blockchain state observer 210 may also trigger a series of events based on the received information. For example, if the blockchain state observer receives information of an initiation of a transaction dispute from the blockchain for transaction events 216, the blockchain state observer may prompt one or more parties to respond to the dispute initiation, or enable the Smart Contracts 210D to resolve the dispute. Method 400, as depicted in FIG. 4 explains various events that may be triggered as a result of the received information in further detail.

In various embodiments, "Smart Contracts" 210C may refer to one or more of an application, application program interface (API), software, hardware, server, or computerized transaction protocol that facilitates, verifies, and/or enforces the negotiation or performance of a contract. In various embodiments presented herein, the contract is configured to govern the payment transaction between the issuer and the merchant or merchant's acquirer. The terms of the contract may be set, for example, by the attributes 210D of the payment transaction as posted to the blockchain, and/or by predetermined rules governing the performance of the contract or dispute resolution. Participants of a dispute resolution process (e.g., consumers, issuers, merchants, acquirers, etc.,) may establish the underlying attributes 210D of the contract governing the payment transaction, and/or the underlying rules of the dispute resolution process, e.g., at the time the participants become members of the blockchain. Smart Contracts 210C may then proceed to execute the payment transaction based on the underlying attributes 210D (and their values) or facilitate the dispute resolution process using the underlying rules. After a blockchain dispute resolution process is performed, the results may be posted to the shared ledger 250 of one or more blockchains, for participants of the blockchains (e.g., the parties to the payment transaction) to view. A party may not agree with the results, and may therefore reinitiate or represent a dispute. A dispute may be settled when both parties agree on the liability. There may be sophisticated rules that govern the settlement in the case both the parties do not agree or if there is a stalemate. For example, the parties may agree to split the liabilities in the case of a disagreement. Furthermore, fraudulent transactions and/or card-not-present (CNP) transactions may be prevented since a merchant or an acquirer may be able to look up this additional information in the blockchain to deny the transaction. In some embodiments, traditional methods of dispute resolution (e.g., payment network dispute resolution) may be relied on after one or more unsuccessful blockchain dispute resolution processes.

In some embodiments, if the transaction information posted to the shared ledger 250 of blockchain for transaction events 216 is agreed on by all participants of the payment transaction, blockchain interface server 210 my use blockchain for settlement 212 for settlement or exchange of funds between the parties of the transaction. Blockchain interface server 210 may facilitate communication and/or transfer data between the blockchains using inter-ledger communication protocol 210F.

Figure 3A:
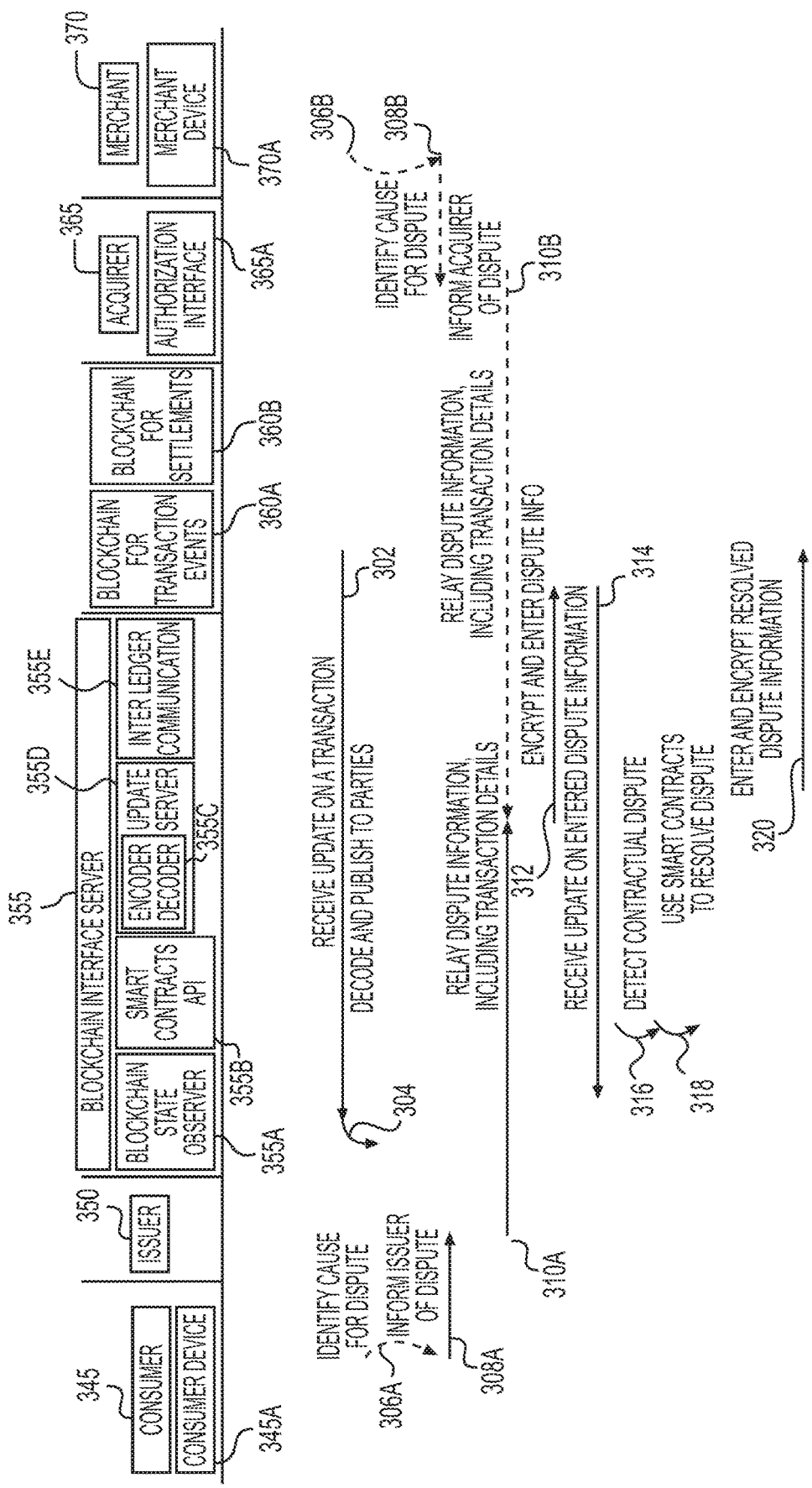
FIGS. 3A-3B depict simplified sequence flow diagrams of a method for managing payment transactions, alerts, dispute settlement, and settlement payments, using multiple blockchains, in accordance with non-limiting embodiments.
Figure 3B:
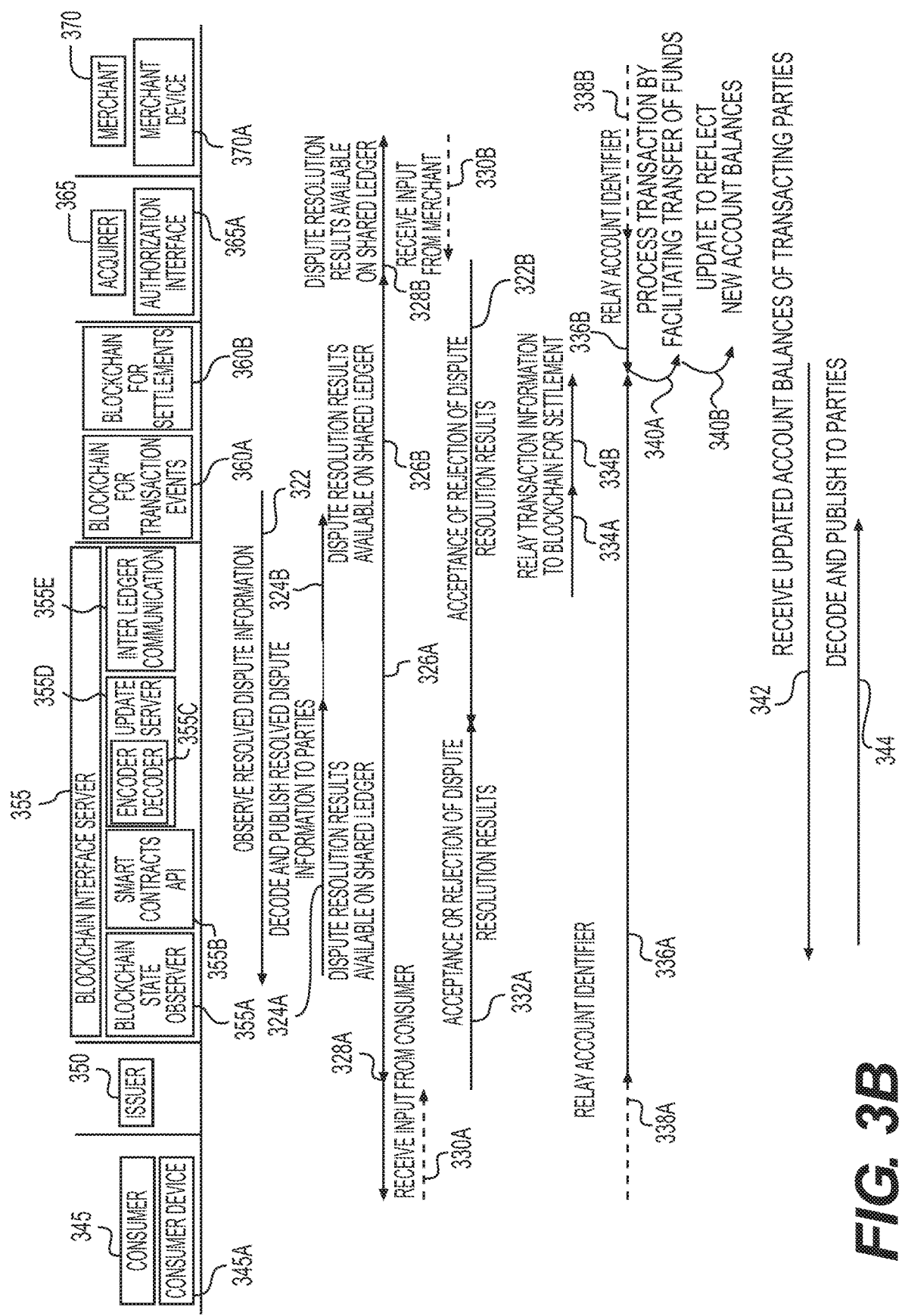

FIGS. 3A-3B depict simplified sequence flow diagrams of a method for managing payment transactions, alerts, dispute settlement, and settlement payments, using multiple blockchains, in accordance with non-limiting embodiments.

Method 300 may be executed by the devices and/or components related to the consumer 340 (e.g., consumer device 340A), the issuer 345, the blockchain interface server 350 (e.g., blockchain state observer 350A; Smart Contracts API 350B; update server 350C; encoder/decoder 350D; a server, system, protocol, and/or plug-in for inter ledger communication 350E, etc.), one or more blockchains 355 (e.g., blockchain for transaction events 355A, blockchain for settlement 355B, etc.), acquirer 360 (e.g., authorization interface 360A), and merchant 370 (merchant device 370A). As explained in FIG. 2, a shared ledger (e.g., as in 250 in FIG. 2) may be accessible to participants of the blockchain, for example, consumer 340 (via consumer device 340A), issuer 345, acquirer 360, and merchant 370. The blockchain interface server 350 may continually or periodically observe the shared ledger and/or blockchain for transaction events 355A, trigger events based on the observations, analyze and/or present the observations (e.g., via data analytics), and/or update one or more of the blockchains and/or shared ledger, e.g., the blockchain for settlement 355B after a fund transfer.

In process flow 306A, a consumer may identify a cause for a dispute. For example, consumer 340 may browse the consumer's bank statements using consumer device 340A to discover that consumer 340 was charged or is being charged more than what was transacted for in a payment transaction originating at merchant 370. Thereafter, in process flow 308A, the consumer may inform the issuer (e.g., consumer's bank) of the dispute.

In process flow 310A, the issuer (e.g., issuer 345) may relay dispute information, including transaction information and the disputed attributes of the transaction, to blockchain interface server 350 (e.g., at the update server 350D). Alternatively or additionally, the dispute may be initiated by the issuer. For example, an issuer may receive transaction related information from an acquirer in a transaction authorization request. An issuer may also receive transaction related information by other means, for example, by the consumer, or via saved records of past transactions originating at the merchant. An issuer may initiate a dispute if there is an inconsistency between the transaction related information received from one or more sources. It is contemplated that in some embodiments, transaction related information may be accessible to the issuer via a shared ledger 250, as part of the blockchain for transaction events 355A, or may be presented by the blockchain interface server (e.g., blockchain state observer) that periodically or continually observes the blockchain for transaction events 355A and/or shared ledger of one or more blockchains to present pertinent information in presentable format to participants of the one or more blockchains. For example, in such embodiments, prior to process flows 306A-310A, process flow 302 may include receiving an update on a transaction by blockchain state observer 350A, and process flow 304 may include decoding and/or publishing the update to the parties (e.g., via the update server 350C and/or encoder/decoder 350D).

In some embodiments or scenarios, for example in process flow 306B, it may be the merchant that identifies a cause for a dispute (e.g., using merchant device 370A) and inform acquirer 360 (e.g., a merchant's bank) of the dispute (e.g., as in process flow 308B). Subsequently, in process flow 3106, the acquirer may relay the dispute information, transaction information, and the disputed attributes of the transaction to the blockchain interface server (e.g., to the update server 350D). Alternatively or additionally, the dispute may be initiated by acquirer 360.

In some embodiments, as shown in process flow 312, blockchain interface server 350 may enter the received dispute information into blockchain for transaction events 355A and/or shared ledger of the blockchain using the blockchain update server 350D. In some embodiments, process flow 312 may involve encrypting and then entering the encrypted information using, e.g., update server 350C and/or encoder/decoder 350D. In some embodiments encoder/decoder 350D may be a part of and/or serve the encoding/decoding function of blockchain update server 350D. The encryption may protect sensitive information of the consumer or merchant, and/or restrict the accessibility of the information. The dispute information may include one or more attributes of the disputed payment transaction originating at the merchant and initiated by the consumer. The attributes of the payment transaction may include, but are not limited to, e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; etc. The encoded dispute information may further include, but is not limited to: an identification of one or more of the attributes that is in dispute, an identification of the disputant, the disputant's proposed modification to the disputed attribute, and geographical and/or temporal information of the dispute.

The blockchain interface server may include an interface (e.g., update server 350D) that may include one or more of an application, application program interface, software, hardware, server, or protocol that allows the addition of information (e.g., an attribute of the payment transaction, a proposed modification of an attribute by a disputing party, etc.) to a blockchain (e.g., blockchain for transaction events 355A) and/or shared ledger. Thus, update server 350D of blockchain interface server 350 may respond to requests to add attributes of a payment transaction, dispute one or more of the previously posted transaction attributes, and/or add a proposed modification to an existing transaction attribute (e.g., for initiating a dispute). The ledgers and/or sub-ledgers of the one or more blockchains may be periodically and/or continually updated, and may be updated to reflect accurate details regarding the payment transaction between participants of the blockchain. Blockchain state observer 350A may periodically or continually receive the latest information from blockchain for transaction events 355A, process and/or analyze the information, and present the information (e.g., in an understandable way) to participants of the transaction, who may also be member participants or nodes of the blockchain for transaction events 355A. Thus, merchant 370 involved in the disputed payment transaction, acquirer 360 for merchant 370, consumer 340 initiating the payment transaction, and issuer 345 for merchant 370, as participants, may be able to understand information and/or events at blockchain for transaction events 355A, or confirm the accuracy of the payment transaction details directly from blockchain for transaction events 355A and/or shared ledger of the blockchain or through blockchain interface server 350 that presents the information from blockchain for transaction events 355A and/or shared ledger. If one of the participants disputes the accuracy of a posted transaction attribute, the participant may initiate the process of entering the disputed information into blockchain for transaction events 355A (e.g., as in process flows 302-310). The ledger may be updated and/or new details may be posted by adding blocks to blockchain for transaction events 355A using pre-defined rules, e.g., agreed on by the participants of the blockchain. In other embodiments, the ledger may be updated and/or new details may be posted, using blockchain mining methods known to persons having skill in the art.

At process flow 314, blockchain state observer 350A of blockchain interface server 350, as part of its function to periodically or continually observe updates to blockchain for transaction events 355A, may receive the update on the entered dispute information from process flow 312. In some embodiments, blockchain state observer 350A need not wait for information to first be entered into blockchain for transaction events 355A before observing the entered information. Thus, in such embodiments, process flow 312 and process flow 314 may occur simultaneously, e.g., blockchain state observer 350A may observe the entering in of the dispute information.

Thus, in some embodiments, blockchain for transaction events 355A may function as a record keeper for the various "events" of a transaction process. "Events" may be observed by blockchain interface server and may set off a downstream process, act as an alert for participants of the blockchain or transaction, may be used for data collecting and/or analytics, and/or may be disregarded. The blockchain for settlement 355B (e.g., Ripple) may function as a master record keeper of account balances and fund transfers for its various member participants. Thus, blockchain for settlement 355B may be utilized once a transaction is ready for final processing or settlement, for example, if no party disputes the transaction information in the blockchain for transaction events 355A.

At process flow 316, blockchain state observer 350A may process the received information from process flow 314 (e.g., the entered dispute information) and detect that there is a contractual dispute. In some embodiments, various aspects of the received information may trigger the detection of a contractual dispute. This detection may be performed by Smart Contracts API 350B.

In process flow 318, blockchain interface server 350 (e.g., via Smart Contracts API 350B) may resolve the dispute related to one or more attributes of the payment transaction using the predetermined rules for dispute resolution. In various embodiments of the present disclosure, attributes of the payment transaction may refer to, for example, details related to a payment transactions (e.g., an identification of the merchant, an identification of the consumer, the transaction amount, an itemization of the goods and/or services transacted for, geographical and/or temporal information of the transaction, any taxes, any tips, any discounts; any fees directed towards acquirers, issuers, payment networks; currency exchange rates; etc.). The rules of the dispute resolution may refer to procedures used for interpreting the transaction attributes, obtaining information related to the dispute, and resolving the dispute. In some embodiments, process flow 318 may be performed using Smart Contracts API 350B, or any computerized transaction protocol that facilitates, verifies, and/or enforces the negotiation or performance of a contract (e.g., as the one governing the payment transaction between the issuer and the merchant or merchant's acquirer). The predetermined rules for the dispute resolution may be set and/or agreed to by participants of the blockchain. For example, the acquirer and the issuer may agree to use certain methods of calculating prices. In another example, the participants may agree that if the issuer approved a transaction that was associated with a fraudulent account, the issuer will not have the right to initiate a chargeback. Participants may enact rules to check for invalid disputes related to fraud, e.g., if the fraud type and the conditions do not match, for example, if the fraud type is a counterfeit fraud but the conditions indicate a theft. Participants may agree to rules to initiate settlement real-time using the blockchain infrastructure to initiate payments. Furthermore, participants may also agree that if the dispute reason is a certain category, e.g., a fraud or an authorization decline, the liable parties may be automatically assigned based upon agreed-upon electronic contracts/rules which use the data in the blockchain to assign liability and may directly initiate settlement if, for example, there is not a trace of doubt in the liable party. In some embodiments, the rules for the dispute resolution may be set by blockchain interface server 350 according to industry standards. In other embodiments, the rules for the dispute resolution may be borrowed from the rules used by various payment networks for the management of disputes.

In some embodiments, blockchain interface server 350 may output results of the dispute resolution by publishing resolved attributes of the payment transaction into one or more blockchains (e.g., blockchain for transaction events 355A), via blockchain update server 350D as in process flow 320. For example, a dispute may be initiated by a merchant who does not agree with a transaction amount contained within a transaction authorization request that is published in a ledger shared by participants of the blockchain (parties to a payment transaction). After the blockchain dispute resolution, the results may include a new block published in a ledger of one or more blockchains, which posts a corrected transaction amount to be deducted from the consumer's payment source. In some embodiments, process flow 320 may involve encrypting the resolved attributes using encoder/decoder 350D of update server 350C.

At process flow 322, blockchain state observer 350A of blockchain interface server 350, as part of its function to periodically or continually observe updates to blockchain 355 may receive the update on the resolved dispute information that has been entered into the blockchain in process flow 320. In some embodiments, the blockchain state observer need not wait for information to first be entered into the blockchain before observing the entered information. Thus, in such embodiments, process flow 320 and process flow 322 may occur simultaneously, e.g., the blockchain state observer may observe the entering in of the dispute results.

Blockchain state observer 350 may process the received information from process flow 320 (e.g., the entered dispute results) and detect that a dispute was resolved. This detection may trigger blockchain interface server 350 to inform and/or present the dispute resolution results to various interested parties (e.g., consumer 340, issuer 345, acquirer 360, merchant 370, etc.). In some embodiments, process flows 324A and 324B may involve decoding the received information on the dispute resolution results (via encoder/decoder 350C) so that the results are readable and/or understandable. Thus, in process flows 326A, 326B, 328A, and 328B, the results of the dispute resolution may be available to issuer 345, acquirer 360, consumer 340, and merchant 370, respectively. In some embodiments, the results and/or process of the dispute resolution may be published in the shared ledger and/or blockchain for transaction events 355A, which may be readily available to the participants of the blockchain (e.g., issuer 345, acquirer 365, consumer 340, and merchant 370, etc.). In other embodiments, while entries in the shared ledger may be accessible to participants of the one or more blockchains, the blockchain interface server may present the information from the shared ledger in a form understandable to the parties or trigger events based on new entries or updates in the one or more blockchains.

At process flow 332A, issuer 345 may accept or reject the results of the dispute resolution, as mediated by blockchain interface server 350. Likewise, at process flow 3326, acquirer 360 may accept or reject the results of the dispute resolution, as mediated by blockchain interface server 350. Process flows 330A and 330B may involve prompting issuer 345 and/or acquirer 360, respectively, to respond to the results of the blockchain dispute resolution process, as published in the blockchain. In some embodiments, the acceptance or rejection of the dispute resolution results may be based on the input of consumer 340 or merchant 370 (e.g., as in process flows 330A and 330B, respectively). Using, e.g., a consumer device, the consumer may view the results of the dispute resolution process as posted on a ledger shared with other participants of the blockchain or as presented by the blockchain interface server based on information gathered from the shared ledger. Likewise, the merchant may view the results of the dispute resolution directly from the same shared ledger or as presented by blockchain interface server 350 based on information gathered from the same shared ledger, using, for example, the merchant's computing system. If one or more of the participants are not satisfied with the results of the blockchain dispute resolution process, the one or more participants may be able to notify blockchain interface server 350 that they disagree with the results ("rejection"), and may also input further information regarding the continued dispute. The one or more participants that are unsatisfied with the blockchain dispute resolution results may enter various dispute information, including, for example, any attributes of the resolved payment transaction that the one or more participants still disputes. For example, after viewing the results of the blockchain dispute resolution, as determined in process flow 318, a merchant (or its issuer) may still not agree with the corrected transaction amount to be deducted from the consumer's payment source to pay for the payment transaction. The merchant (or its issuer) may inform the blockchain interface server of its rejection of the results, and submit new dispute information, including the transaction amount that the merchant (or its issuer) believes to be correct. The blockchain interface server may use the received dispute information, including the new proposed attributes of the payment transaction, to initiate and resolve a new dispute. Thus, process flows 302 through 332A-B may be repeated until the participants agree to the results of the blockchain dispute resolution. In some embodiments, there may be rules that provide bounds on the number of times a dispute can be re-initiated. It is contemplated that in such embodiments, the smart contract rules may be configured to be at least sufficiently inclusive and versatile to handle multiple different dispute scenarios to prevent or minimize the possibility of failed dispute resolutions.

Alternatively or additionally if one or more of the participants indicate that they are still unsatisfied with the results of the blockchain dispute resolution, and present further dispute information, the blockchain interface server may relay the dispute information to a payment network system conventionally used to resolve disputes. according to conventional methods known to those having ordinary skill in the art. In other embodiments, it is contemplated that the blockchain dispute settlement process may eliminate the need for payment network dispute settlement, and thereby prevent the need for maintaining two dispute settlement systems for a potential dispute. In further embodiments, it is also contemplated that any dispute settlement may be confined to the blockchain dispute settlement process, e.g., to reduce the cost of having to maintain more than one dispute settlement systems.

In some embodiments, the results of a dispute settlement may be readily available to the issuer, acquirer, consumer, and merchant, as participants in a blockchain, via a shared ledger that may be viewed, for example on a consumer device or computing system. In such embodiments, the results and/or process of the dispute resolution may be published in blockchain for transaction events 355A, which may be readily available to the participants of the blockchain (e.g., issuer, acquirer, consumer, merchant, etc.) or be presented by the blockchain interface server in a way that is readable and understandable to the parties.

If there is no dispute as to the results of the dispute settlement, and/or the parties to the transaction (or participants of the blockchain for transaction events 355A) consent to the validity of the corrected transaction information, process flows 334A and 334B may include relaying at least some of the transaction information to blockchain for settlement 355B. The at least some of the transaction information may include for example, the amounts of a fund or resources to be transferred and the identities of the parties and/or the accounts of each party from which to be transacted. Process flow 336A may include relaying the consumer's or issuer's PAN, cryptocurrency ID, and/or other account identifier to blockchain for settlement 355B. Likewise, process flow 336B may include relaying the merchant's or acquirer's issuer's PAN, cryptocurrency ID, and/or other account identifier to the blockchain for settlement 355B.

In some embodiments, process flows 334 and 336A-B may be performed as one process flow. The blockchain interface server may be in charge of relaying the transaction information from blockchain for transaction events 355A to blockchain for settlement 355B using, for example, inter ledger communication 350E. The relayed transaction information and various account IDs, PANs, or cryptocurrency IDs may be published and/or encrypted into blockchain for settlement 355B using update server 350C and encoder/decoder 350D.

In some embodiments, the blockchain for settlement 355B may be a real-time gross settlement system (RTGS), which may facilitate the exchange of a currency or cryptocurrency and serve as a remittance network, and which may be designed to comply with risk, privacy and compliance requirements (e.g., Ripple). Thus, at process flow 338, the transaction may be processed by facilitating the transfer of funds or resources from the respective accounts of the parties to the transaction. At process flow 340, blockchain for settlement is updated (e.g., via update server 350C and/or encoder/decoder 350D) to reflect the new balance of the accounts for the participants of the transaction.

At process flow 342, blockchain state observer 350A of blockchain interface server 350, as part of its function to observe updates to blockchains, may receive an update to the accounts of transacting parties by observing blockchain for settlement 355B. At process flow 344, blockchain interface server 350 may decode and/or otherwise make accessible, information of the updated account balances to the transacting parties (e.g., consumer 340, issuer 345, acquirer 365, merchant 370, etc.). Blockchain interface server 350 may be configured to ensure privacy, for example, each transaction participant may be only allowed to see their own account balances. In some embodiments, parties may be able to view their new account balances readily via a shared ledger of the blockchain for settlement 355B, or via other means.

The end users of the systems for payment transactions presented herein may be able to view the processes involved, including the transfer of funds, via a front-end integration using a Microservices based architecture. While settlement of funds (e.g., using blockchain for settlement) can be driven by events generated from the Blockchain for transaction events (e.g., a resolution or a lack of a transaction information dispute), transaction events may also lead to further events other than a settlement of funds. These other events may include, but are not limited to fraud events, risk or compliance events, etc. It is contemplated that other blockchain networks may be used like the blockchain for settlement for the purpose of managing or recording these various functions driven by the events.

These events can be choreographed using Micro Services as opposed changing the front-end or using orchestration. There are significant benefits tied to using a Microservices based architecture to decouple applications and employing a development operations (DevOps) approach for development and scaling the services independently, the benefits including but not limited to continuous delivery and deployment. It is contemplated that architectures similar to or providing benefits as Microservices may also be used. In various embodiments of the present disclosure, Microservices may refer to individual services provided to the end user, to enhance the user's interaction with various blockchain networks. In some embodiments, Microservices may interact with queues to publish updates and/or other services with specific functions, e.g., settlement services, notifications. For merchants, Microservices may enable a queue to be read and nay perform settlement. Furthermore, Microservices may display various information, e.g., in a customer service portal. Thus, Microservices may be designed to perform very specific functions well and may have its own infrastructure and repository, and hence can be scaled independently of other micro services depending on the volume and traffic. The Microservices component may adds additional flexibility to the overall architecture.

FIG. 4 depicts a block diagram of a general method 400 for processing and executing upon information received by a blockchain interface server, in accordance with a non-limiting embodiment. Moreover, information may be received periodically and/or continually from the blockchain, e.g., via the blockchain state observer of the blockchain interface server. Various events may be generated based on the received information. Some events may involve, for example, storing information into a data store, and this information may be used for data analytics, or be presented via a Smartbot to a user. Furthermore, some events may involve, for example action notifications that may kick-off downstream activities, for example, settlement or dispute notice generation. In at least some embodiments of the present disclosure, a blockchain and/or shared ledger may record the series of events for a transaction, from which the blockchain interface server may observe and generate downstream events, if needed and/or merely alert participants of the transaction of the event.

The information being received from the blockchain for transaction events and/or shared ledger may be a transaction event of a series of transaction events for a transaction. In some embodiments, the series of transaction events for a transaction may signify the various events that occurred during the course of a transaction, e.g., from its initiation at a merchant by a consumer to the initiation of a dispute. Further, each transaction event may be added to the blockchain for transaction events and/or shared ledger of the blockchain in a chronological order or may be timestamped. Thus, in some embodiments, the blockchain interface server may receive information about a transaction, as each new transaction event is added to the blockchain for transaction events and/or shared ledger of the blockchain.

In some embodiments, prior to the blockchain interface server being able to receive information about a payment transaction, a payment transaction may be initiated. Thus, step 402 may include entering the initiation of payment transaction on to one or more blockchains of a plurality of blockchain networks. These blockchains may each be involved in the various functions or business of a payment transaction. For example, a blockchain for transaction events may serve as a record keeper for the various events involved in a payment transaction originating at a merchant. A blockchain for settlement may be involved in the final transfer or settlement of a currency or cryptocurrency between participants of a transaction. Having a plurality of blockchains may ensure that information may be shared by some member participants but kept private from other member participants of the payment transaction. Having a separate blockchain for settlement (e.g., Ripple) may also assist in the compliance of the blockchain-based payment system with regulations and standards of the financial industry. Thus, at step 402, a block may be added that encodes (e.g., using an encoder/decoder) the attributes of an initiated transaction (e.g., merchant and/or acquirer ID; transaction amount; issuer and/or consumer ID; description and/or ID of transacted good(s) and/or services; geographical and/or temporal information; taxes, tips, and/or discounts; any fees to be directed to acquirers/issuers, etc.)

Step 404 may include continually or periodically observing status of the transaction, for example, using a transaction identification. In some embodiments, the transaction identification may serve as a key to access information regarding the attributes of the payment transaction. The observed status may include, for example, a step in the payment transaction process, an initiation of a dispute regarding the payment transaction, a step in the dispute settlement process of the payment transaction, etc. The status may be observed, for example, from the blockchain for transaction events, which may serve as a record of events that take place through a payment transaction.

Step 406 may include decoding and/or publishing the observed status to one or more parties of the transaction. The decoding and/or publishing may be performed by an encoder/decoder of the blockchain interface server so that the results are readable and/or understandable. The published status may be accessible to interested parties (e.g., merchant, consumer, acquirer, issuer, etc.), for example, via a user interface on a user device.

Figure 5A:
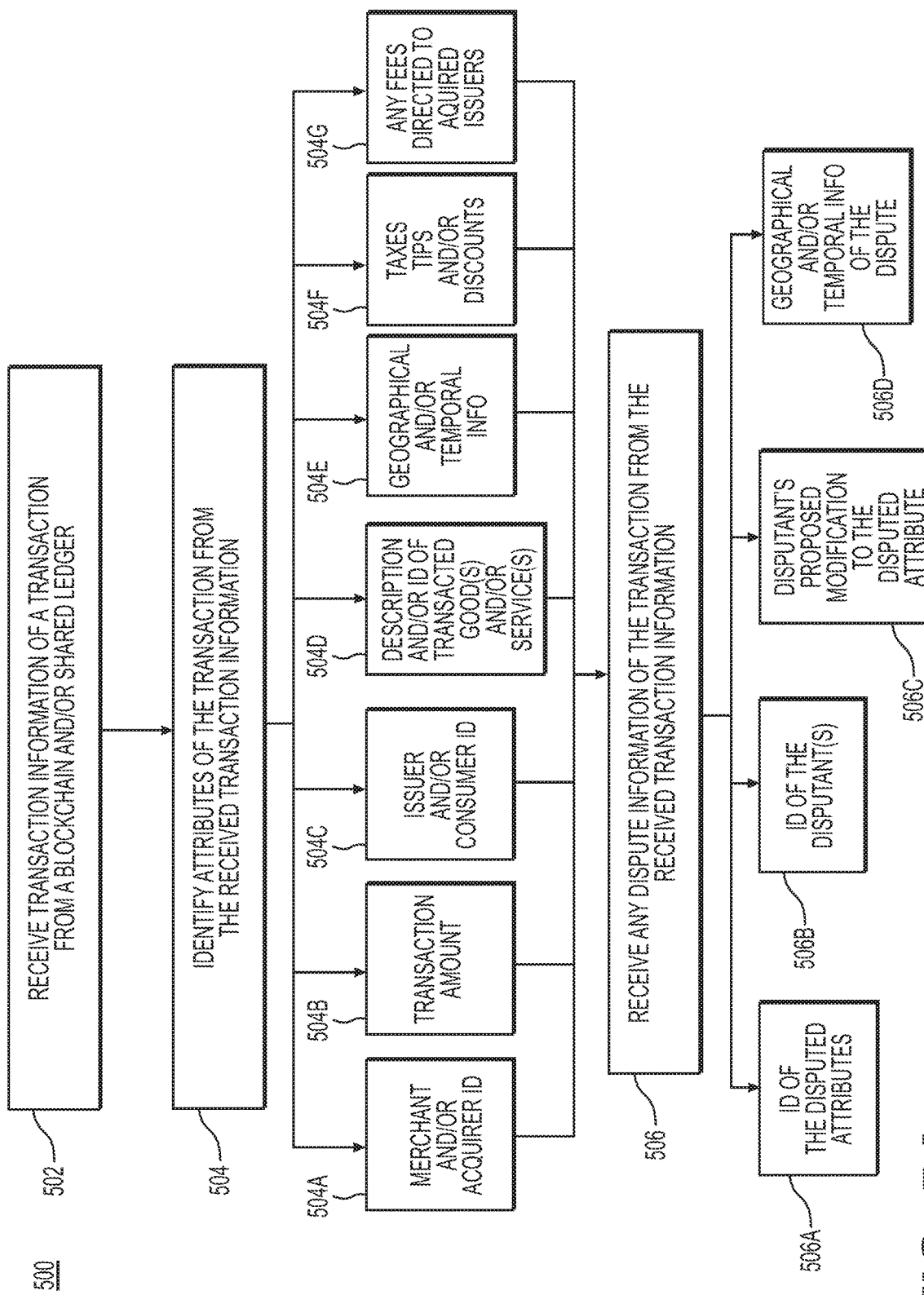
FIGS. 5A-5B depict block diagrams of a general method of analyzing data received from multiple blockchains, in accordance with non-limiting embodiments.
Figure 5B:
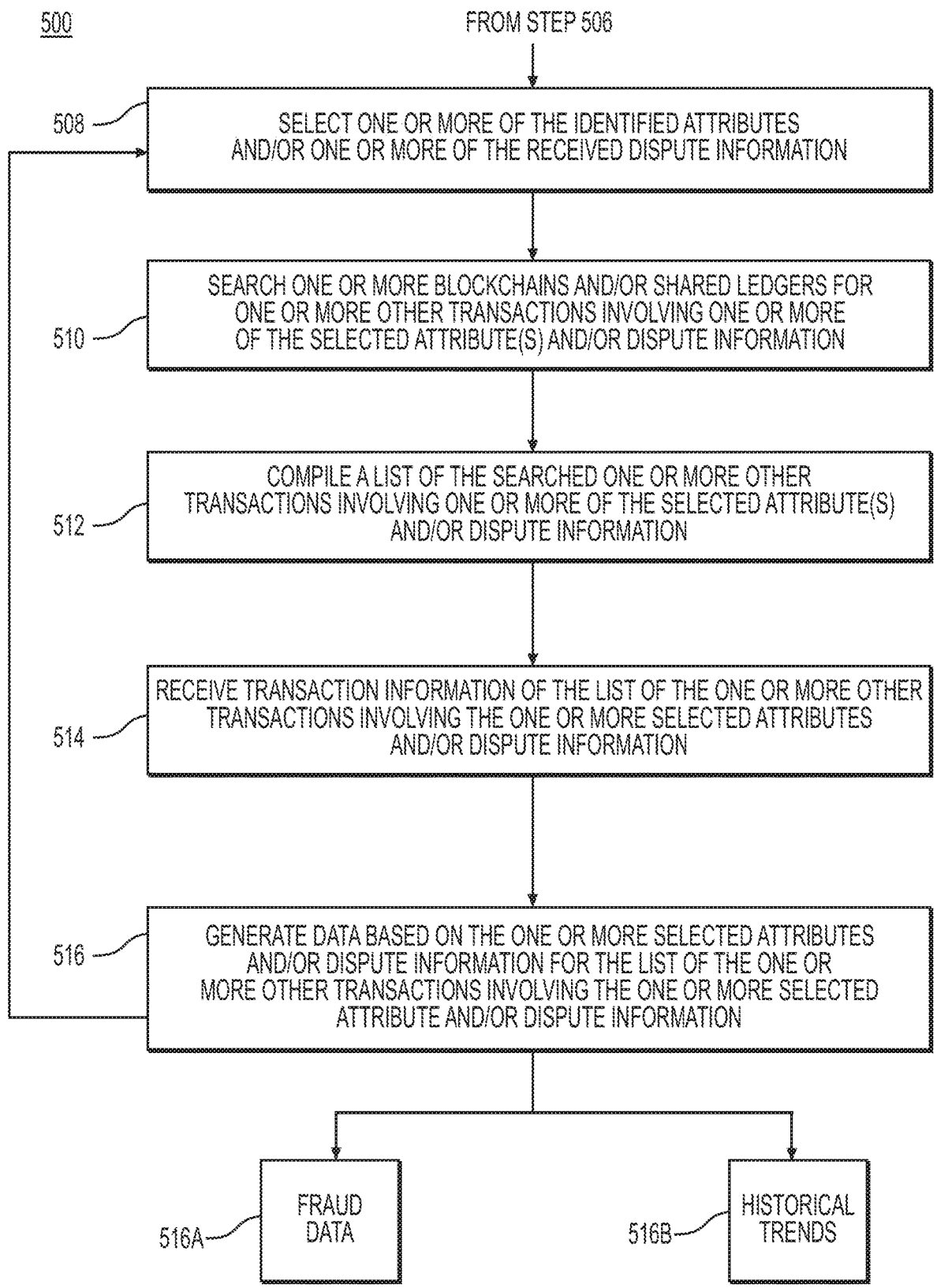

Step 408 may include determining whether the observed status warrants further action before a transaction is ready for processing. Various statuses may warrant action, and this may involve determining, for example, whether the observed status is awaiting for an input (e.g., a response) from a party (e.g., as in 410A), and/or determining whether the observed status indicates an unresolved dispute (e.g., as in step 414A). In some embodiments, if the blockchain interface server had received instructions or input to perform data analytics for one or more attributes of the transaction, the observed status may warrant a further action to perform and display data analytics for the one or more attributes of the transaction, as will be described in further detail in method 500 as depicted in FIGS. 5A-5B.

Therefore, in one embodiment, if at step 408, the blockchain interface server determines that the observed status warrants further action before the transaction is ready for processing, subsequent steps would involve determining the further action. For example, step 410A may include determining whether the observed status awaits input from a party of the transaction. In some embodiments, the party of the transaction may be a member participant of a blockchain and/or shared ledger (e.g., blockchain for transaction events).

If, at step 410A, the blockchain interface server determines that the observed status is awaiting for an input from a party, the blockchain interface server may inform the party and receive the awaited input from the party (e.g., as in step 410B). Furthermore, a party may already be informed of the observed status and the awaited and/or requested input, for example, from step 406. In such embodiments, a party may merely respond and/or may provide an input based on the information published in step 406. At step 412, the blockchain interface server may encode and/or enter the received input from the party on to the blockchain for transaction events and/or shared ledger of the blockchain. Alternatively or additionally, the received input may be published and/or otherwise be accessible to one or more parties of the transaction (e.g., as in step 406). Subsequently, the blockchain interface server may proceed to step 414A, which may involve determining whether the observed status indicates an unresolved dispute.

Additionally, if, at step 410A, the blockchain interface server determines that the observed status is not awaiting for an input from a party, the blockchain interface server may subsequently determine, at step 414A, whether the observed status indicates an unresolved dispute. In some embodiments, there may be an indication of an unresolved dispute if there are conflicting entries or data for a transaction attribute (e.g., the merchant and consumer contest the amount of a transaction good(s) and/or service(s)). The conflicting entries may be detected from the blockchain for transaction events by the blockchain interface server, for example, if two differently timestamped blocks have inconsistent data entries for the same transaction attribute of the same transaction.

If, at step 414A, the blockchain interface server determines that the observed status indicates an unresolved dispute, step 414B may include enabling Smart Contracts to resolve the dispute.

Smart Contracts may also be used to exchange money or anything of value in general. For example, Smart Contract may be a logical construct that may be executed when a dispute reaches a certain state. For example, if there is a duplicate transaction in the receipt attributed to a cardholder, it may be the case that a cardholder would not be held responsible for the additional transaction if he or she did not make that transaction. The blockchain may be updated and indicate a state change of "transfer funds back to cardholder." The state change may be indicated using specific codes, and the state may be reflected on each node of the blockchain governing a dispute. Once this happens, the money may change hands. A Smart Contract may facilitate and/or enhance this process. In the above example, a Smart Contract may credit the card holder through the Issuer or financial institution that the card holder interacts with and send debit to the Merchant. Similarly, if a card holder were to be found liable, the card holder may be penalized, e.g., for a friendly fraud, which might limit the card holder's ability to initiate disputes in the future. Thus, a Smart Contract may define the rules and penalties around an agreement in a similar method of a traditional contract, and may also automatically enforce those obligations. Intermediaries need not be required for a Smart Contract to be completed.

At step 414C, the blockchain interface server may encode and/or enter the resolved dispute information (from step 414B) on to the blockchain and/or shared ledger. Alternatively or additionally, the blockchain interface server may also publish and/or make accessible the resolved dispute information (e.g., as in step 406).

On the other hand, if the blockchain interface server determines, at step 414A, that the observed status does not indicate an unresolved dispute, the blockchain interface server may relay and/or encode the transaction information to another blockchain (e.g., blockchain for settlement) of the plurality of blockchain networks (e.g., as in step 416A). If at step 408, the blockchain interface server determines that the observed status does not warrant any further action before the transaction is ready for processing, the blockchain interface server may also proceed to relay and/or encode the transaction information to another blockchain (e.g., blockchain for settlement) of the plurality of blockchain networks (e.g., as in step 416A). This blockchain (e.g., blockchain for settlement) may be in charge of recordkeeping account data of the various participants of the transaction. The transfer of pertinent transaction information by the blockchain interface server may involve, for example, an inter ledger communication protocol, as known by persons having ordinary skill in the art. The pertinent transaction information may include, for example, the transaction participants' identifications, for the blockchain for settlement to appropriately track the accounts of the participants, the amounts owed or to be transferred for each participant, etc.

Subsequently, the blockchain interface server may then process the transaction and update the blockchain for settlement and/or shared ledger of the blockchain (e.g., as in step 416). The processing and updating of the transaction may include, for example, adding or updating the blocks of the blockchain for settlement that indicates new account balance for the participants of the transaction that are involved in the exchange of funds. The new account balance can reflect currency, cryptocurrency (e.g., bitcoins, Litecoins, etc.), commodities, etc.

For example, Bitcoin, a cryptocurrency, may be a completely decentralized digital payment system peer to peer (p2p) system enabling settlement or transactions to take place between two parties without an intermediary. Each party may identify the other party using a public bitcoin address and do not know anything in addition to that about the other party. The blockchain for settlement may use this bitcoin address to track the transaction participant's account for the purpose of updating and recording the transfer of bitcoins for the transaction.

In such embodiments, the transactions may be verified by network nodes of the blockchain (e.g., blockchain for settlement) and may be recorded in a public or private ledger of the blockchain.

It is also contemplated that cryptocurrency other than bitcoins may be used for the processing of the transaction. Using other forms of cryptocurrency may overcome the growing problem of "Bitcoin latency," where verifying a transaction takes an inconveniently long time (e.g., approximately 43 minutes). "Bitcoin latency" may partially stem from the fact that participants and/or members of a transaction (e.g., consumers, issuers, merchants, acquirers, etc.) may add a fee to every bitcoin transaction, which may bump that transaction up in a queue. This may result in those who could not pay such a fee (or could not pay a sufficiently big fee) to wait hours and sometimes even days for a transaction to complete.

Therefore, in some embodiments, Litecoin may be an alternate cryptocurrency that may be used in the processing of the transaction, e.g., by a blockchain for settlement. Litecoin may be a peer-to-peer cryptocurrency and open source software project released under the MIT/X11 license, and may be inspired by and/or be technically nearly identical to bitcoin (BTC), Litecoin creation and transfer may be based on an open source protocol and thus may decentralized. The Litecoin Network aims to process a block every 2.5 minutes, and may therefore allow for faster transaction confirmation A drawback to Litecoins may include a higher probability of orphaned blocks in the blockchain (e.g., blockchain for settlement). Advantages of using Litecoins may include, for example. greater resistance to a double spending attack over the same period as a bitcoin. However, the total work done may be a consideration. For example, if the Litecoin Network has comparatively ten times less computing work done per block than the bitcoin network, the bitcoin confirmation may be around ten times harder to reverse, even though the Litecoin Network may be likely to add confirmation blocks at a rate that may be four times faster. Nevertheless, alternate cryptocurrencies like Litecoins, may be able to overcome regulatory and/or compliance issues that may result from adopting a public bitcoin network for the cryptocurrency used in processing the transaction, e.g., in step 416B.

In one embodiment, step 416B may be performed by an entity other than the blockchain interface server.

In some embodiments, subsequent to resolving a dispute (e.g., as in step 414C) or processing a transaction (e.g., as in step 416B), the blockchain interface sever may continue to periodically or continually observe the status of the payment transaction (e.g., as in 404) and repeat one or more of the steps described above.

In one or more embodiments, the published records of transaction information and dispute information (e.g., in the blockchain for transaction events) may be periodically or continually retrieved and stored in computing systems in addition to or other than the blockchain interface server that may be participants of one or more of the blockchains. The stored transaction information and dispute information may be periodically or continually analyzed to generate information (e.g., data analytics) that may be useful to other participants of the transaction or the plurality of blockchains.

FIGS. 5A-5B depict block diagrams of a general method of analyzing data received from multiple blockchains, in accordance with non-limiting embodiments. Method 500 may be performed by the blockchain interface server, which may, at the request of a participant or user (e.g., consumer, merchant, acquirer, issuer, etc.) periodically or continually observe the status of a blockchain (e.g., blockchain for transaction events) and/or shared ledger pertaining to a payment transaction or dispute, receive information from the blockchain (e.g., blockchain for transaction events) and/or shared ledger of the blockchain pertaining to a payment transaction or dispute, and perform data analysis. In other embodiments, method 500 may be performed by a computing system and/or server that may be a participant or be able to access a blockchain (e.g., blockchain for transaction events) or shared ledger and retrieve transaction information of transactions and/or dispute information regarding dispute settlement processes involving the transactions.

Step 502 may include receiving transaction information of a transaction from a blockchain (e.g., blockchain for transaction events) the shared ledger. In order to receive the transaction information, the blockchain interface server may retrieve transaction information using a transaction identifier, for example, based on the request or input by a participant of the blockchain or payment transaction, or as part of a periodic routine. In some embodiments, step 502 may be performed by a computing system or server of a participant of the blockchain or shared ledger in which the transaction information has been encrypted or stored (e.g., in a block). The transaction information may include various attributes of the transaction, which may be identified in step 504. For example, the attributes of the transaction may include, but are not limited to, e.g., an identification of the merchant and/or acquirer (e.g., merchant and/or acquirer ID 504A), the transaction amount(s) of one or more transacted good(s) or service(s) 504B, an identification of the issuer and/or consumer (e.g., issuer and/or consumer ID 504C), a description and/or identification of the transacted good(s) and/or service(s) 504D, geographical and/or temporal information of the transaction 504E, any taxes, tips, and/or discounts 504F; and any fees directed to the acquirer or issuers 504G (e.g., markup fees, interchange fees, etc.).

Alternatively or additionally, step 506 may include receiving any dispute information of the transaction from the shared ledger. In order to receive the dispute information, the blockchain interface server may use a transaction identifier to access blocks of the blockchain and/or shared ledger having information on the latest update and/or status. Like step 502, in some embodiments, step 506 may be performed by a computing system or server of a participant of the blockchain or shared ledger in which the dispute information has been encrypted or stored (e.g., in a block). The dispute information may include, but are not limited to: an identification of one or more of the attributes that is in dispute 506A, an identification of the disputant(s) 506B, a disputant's proposed modification to the disputed attribute 506C, and geographical and/or temporal information of the dispute 506D. It is contemplated, however, that there may not have been any disputes for some transactions whose information may be stored in and/or published in the shared ledger, and for whom transaction information may be received in step 502. In such embodiments, step 506 may not be performed.

Step 508 may include selecting one or more of the identified attributes and/or one or more of the dispute information, e.g., for further analysis. In some embodiments, the selection may be made on the basis of a user input. For example, a user (e.g., a fraud prevention service) may be interested in knowing more about the disputant to a transaction. In such an example, the user may input the selection of the disputant in the blockchain interface server performing method 500 to determine, e.g., whether the disputant in a transaction has a history of initiating frivolous disputes in other transactions.

Step 510 may include searching one or more blockchains and/or a shared ledgers for one or more other transactions involving one or more of the selected attribute(s) and/or dispute information. For example, a user may want to know other transactions involving the same disputant as the transaction whose information was received in step 502. In another example, a user may want to know other transactions involving the same good and/or service transacted for in the transaction whose information was received in step 502. The searched blockchain and/or shared ledger may be the same as that from which the transaction information was received in step 502. Alternatively or additionally, the searched blockchain and/or shared ledger may be different, or may involve different participants.

Step 512 may include compiling a list of the searched one or more other transactions involving the one or more selected attribute and/or dispute information.

Step 514 may include receiving transaction information for the one or more other transactions involving the one or more selected attribute or dispute information. For example, if the transaction information received in step 502 involved a transaction of an airline flight, and a user had selected (via user input) to receive more information about other transactions involving the same airline flight, step 514 may include receiving transaction information (e.g., attributes) of the other transactions involving the airline flight. Each of the other transactions may have its own transaction information with its own set of attributes. For example, the user may be able to know of other merchants, consumers, issuers, and/or acquirers involved in the airline flight purchase, transaction amounts for those other transactions involved in the airline flight purchase, etc. This information may be useful, for example, to see inconsistencies in transaction amounts, or to detect a fraudulent party.

Step 516 may include generating data based on the one or more selected attribute or dispute information of the received transaction information (e.g., from step 502) for the one or more other transactions involving the one or more selected attribute or dispute information. In various embodiments presented herein, the generated data may be collectively referred to as "blockchain analytics." For example, if the attribute of the original transaction that had been selected in step 508 to be analyzed is the consumer of the original transaction, blockchain analytics may show other trends based on other transactions of the consumer. These other transactions of the consumer may not have the rest of the same attributes as the original transaction. For example, these other transactions may be between the consumer and other merchants, for different good(s) and/or services, or conducted in entirely different geographical and/or temporal settings. The generated blockchain analytics may provide trends 416B in the consumer's other transactions, for example, the number of transactions conducted by the consumer over time, an inclination of the consumer towards transacting with certain merchants and/or merchant groups or for certain good(s) and/or services over time, and etc. In some embodiments, blockchain analytics may provide key statistics (e.g., mean, median, correlational data, etc.) for the one or more attributes of the original transaction, as being used in other transactions, for example. The key statistics may help identify patterns in the attribute (e.g., consumer behavior) that indicate fraud and/or initiate disputes.

Alternatively or additionally, step 516 may include generating blockchain analytics to analyze disputes/fraud data 516A to enable merchants and issuers (FIs) to reduce to occurrences of fraud. The fraud may include unintentional, "friendly" fraud and/or other types. For example, if one or more attributes being analyzed includes the good and/or service being transacted for in the original transaction, and the blockchain analytics indicates (e.g., in the trends 516B) that the particular good and/or service being transacted for has caused disputes or has been found to be fraudulent in multiple other transactions, a participant of the original transaction (e.g., merchant or consumer) who is seeking to transact the good and/or service may use this data to stop the transaction, and thereby prevent a future fraud from occurring. Thus, participants of the original transaction (e.g., merchant, consumer, etc.) may use the blockchain analytics data to pro-actively identify a fraudulent transaction and stop the shipment of goods/services. Analyzing trends 516B may lead one to predict future fraud or to prevent disputes.

Figure 6:
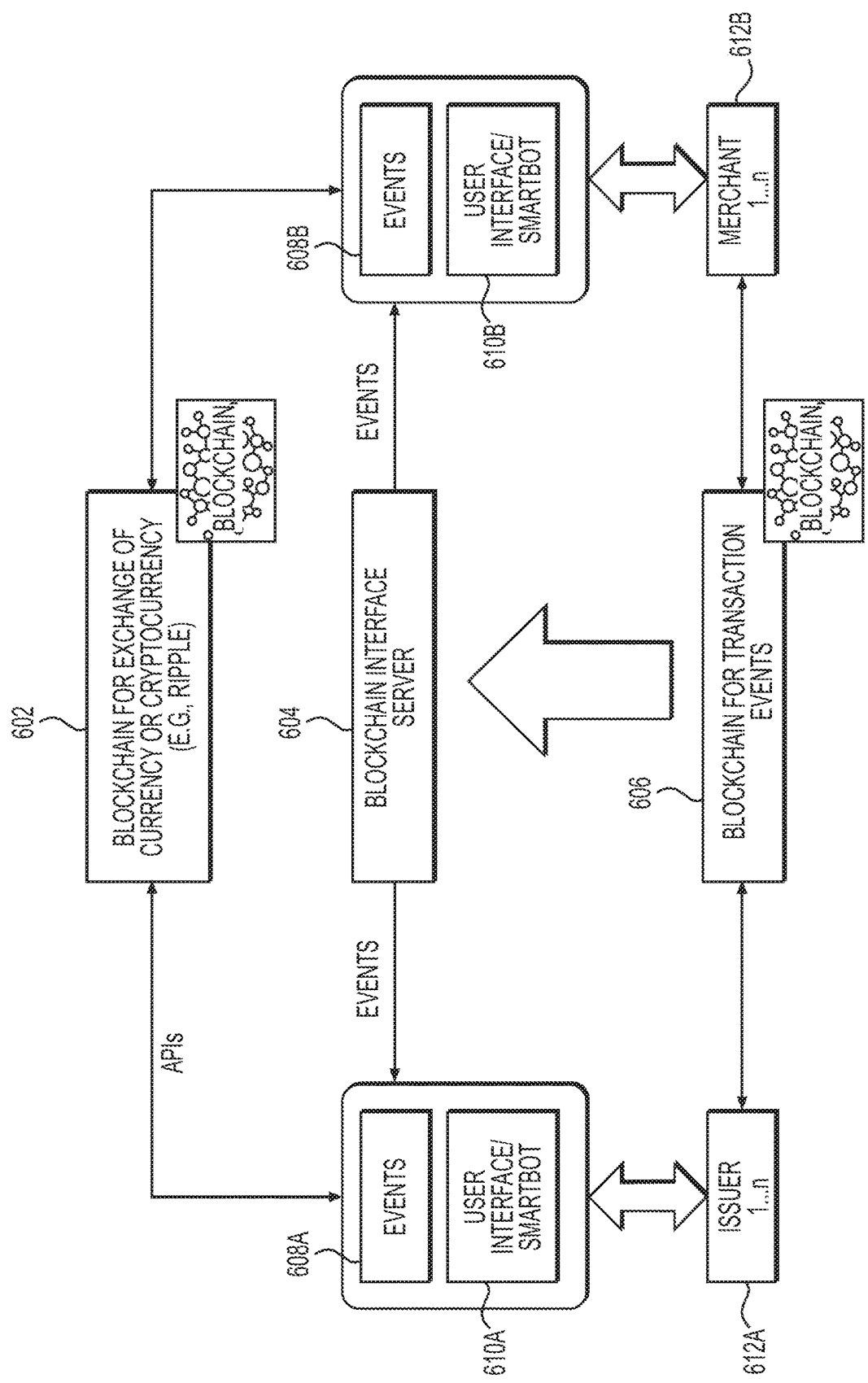
FIG. 6 depicts an exemplary flow diagram of two blockchains used in the management of payment transactions, alerts, dispute settlement, and settlement payment, in accordance with non-limiting embodiments
Figure 8:
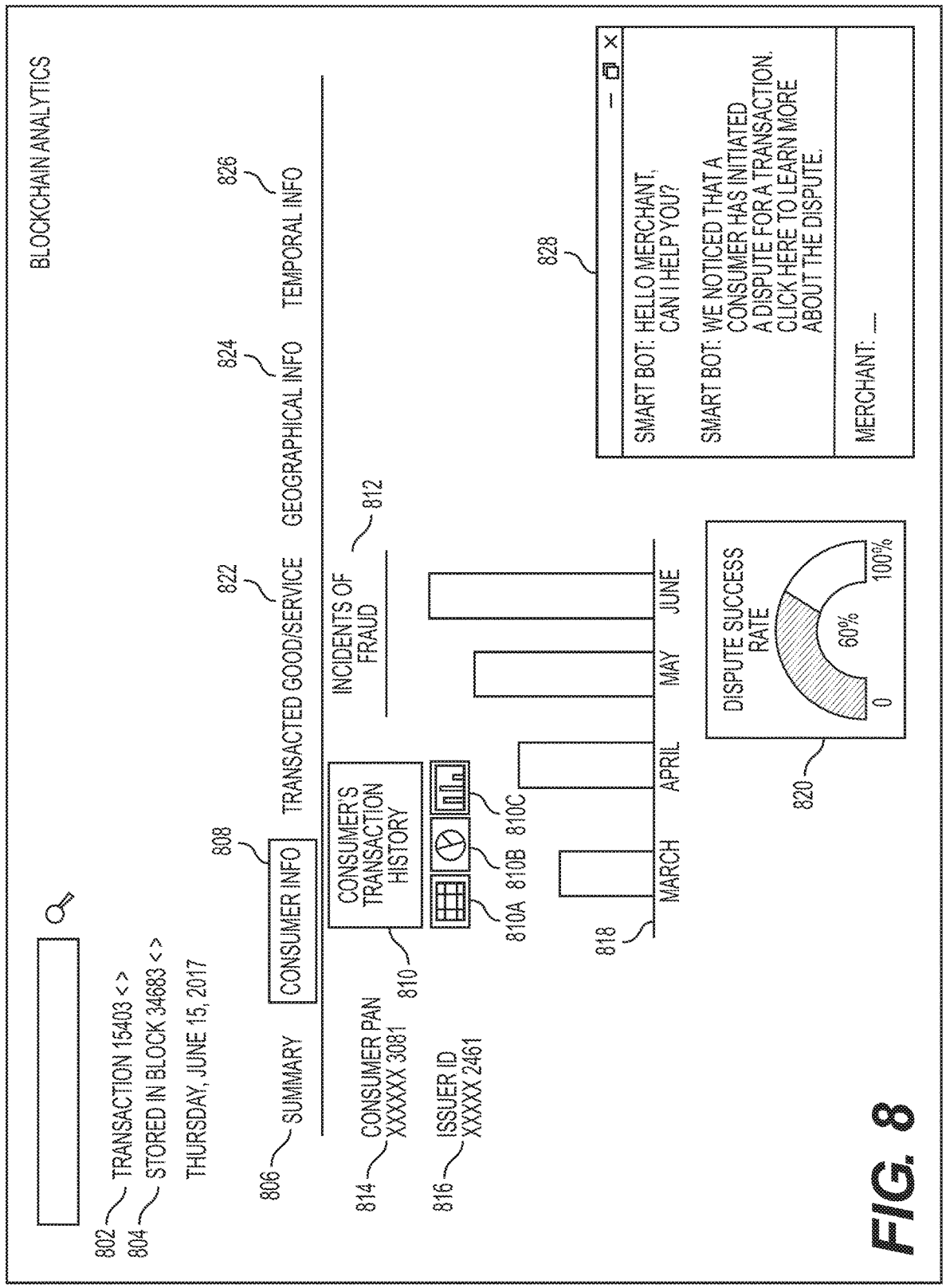
FIG. 8 depicts an exemplary screenshot of a user interface for analyzing transaction attributes and dispute information using a blockchain interface server.

FIG. 6 depicts an exemplary flow diagram of two blockchains used in the management of payment transactions, alerts, dispute settlement, and settlement payment, in accordance with non-limiting embodiments. For example a blockchain for transaction events 606 may record sequential events of a payment transaction, from the origination at a merchant by a consumer to the final processing. The recordation of each event may be made to a shared ledger of blockchain for transaction events 606, which allows for permanence, encryption, and proof-of-work, as known to persons having ordinary skill in the art. Thus, blockchain for transaction events 606 may record events for any number of transactions involving a number of participants (e.g., issuer 1 . . . n 612A, merchants 1 . . . n 612B, consumer, acquirer, etc.), each transaction being based on and/or trackable via a transaction identifier, Blockchain for transaction events 606 may be, a public, private, and/or hybrid blockchain (e.g., a consortium blockchain), having a ledger that may be shared by member participants. A blockchain for settlement of currency or cryptocurrency 602 may a real time gross settlement system that records the final transfer of funds or tokens between transacting parties (e.g., issuer 612A and merchant 612B). The shared ledger of blockchain for settlement of currency or cryptocurrency 602 may be updated to reflect the new account balances of the transacting parties, following the processing of the transaction. Thus, blockchain for settlement of currency or cryptocurrency 602 may hold, at least the undisputed balance of, the accounts for its various member participants, for example, any number of issuers (e.g., issuer 1 . . . n 612A) and any number of merchants (e.g., merchants 1 . . . n 612B). One example of the blockchain for settlement of currency or cryptocurrency 602 is Ripple, a real-time gross settlement system that may enable a secure, instant, and nearly free financial transaction, which may support the use of currency, cryptocurrency (e.g., bitcoins, Litecoins, etc.), and/or commodities, based on a shared ledger. In some embodiments, the shared ledger of blockchain for settlement of currency or cryptocurrency 602 may overlap in member participants (nodes) or in the information recorded with blockchain for transaction events 606. Nevertheless, having distinct blockchains may help ensure privacy of information, integration with existing financial transaction regulations and standards, and a division of business functions. Blockchain interface server 604 may periodically or continually observe the blockchains for new updates (e.g., events 608A and 608B) for a payment transaction and present and/or make accessible information related to each update to the interested participants (issuer 1 . . . n 612A, merchant 1 . . . n 612B, etc.). The participants of the transaction may be informed of these events, analyze or research further based on these events, and/or enter input (e.g., initiate dispute, accept or reject dispute resolution results) using user interface on a user device or computing system (e.g., User Interface/SmartBots 610A and 610B). For example, a user may wish to analyze certain attributes of a transaction further using data analytics according to method 400 presented in FIGS. 4A-4B. Furthermore, as illustrated in FIG. 8 and explained herein, the user interface may allow the user to utilize Smartbots to be able to be able to better interact with data presented.

Figure 7:
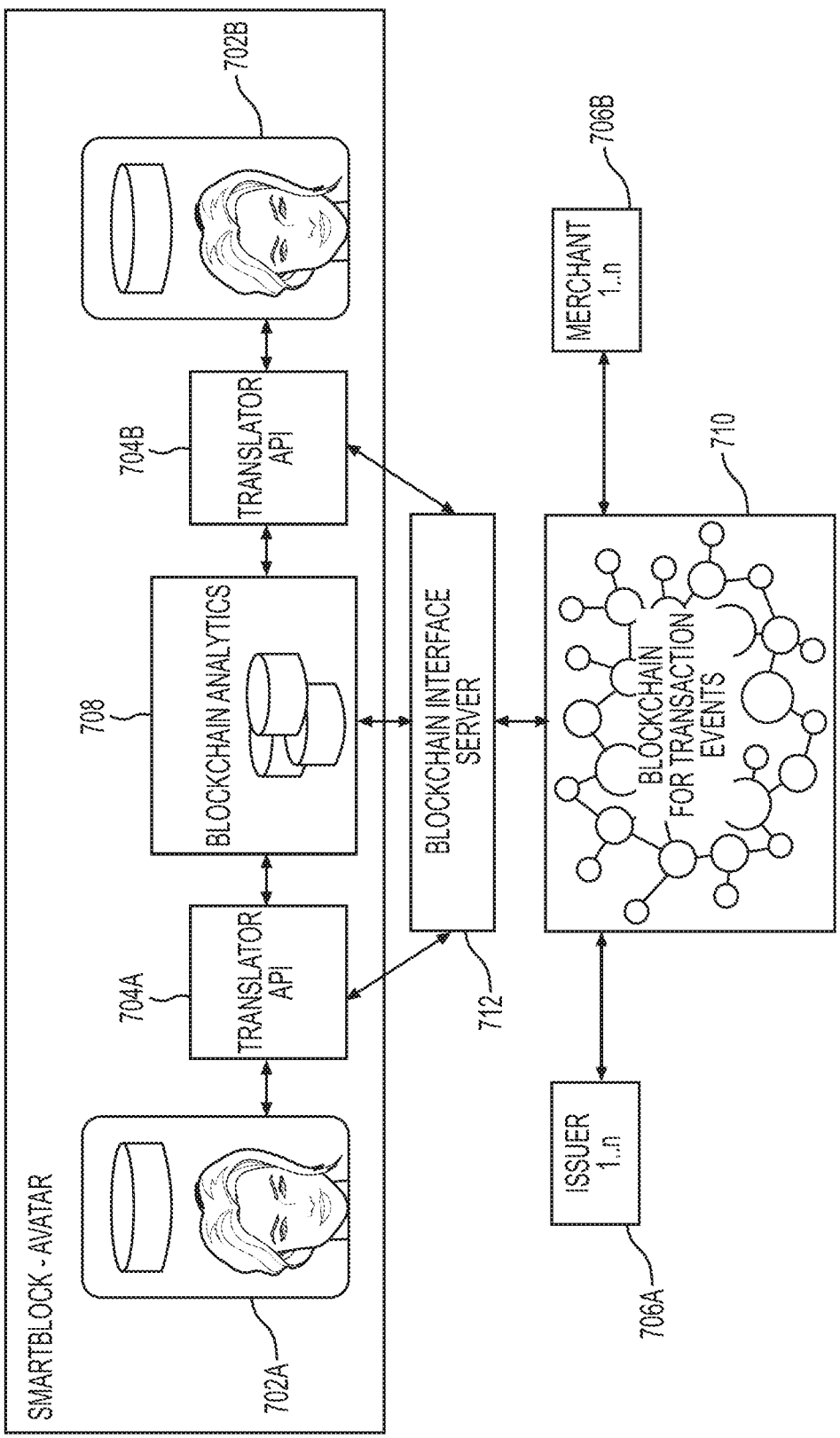
FIG. 7 depicts an exemplary flow diagram of an interactive bot feature of the user interface for analyzing transaction attributes and dispute information, using a blockchain interface server.

FIG. 7 depicts an exemplary flow diagram of an interactive bot feature of the user interface for analyzing transaction attributes and dispute information, using blockchain. The interactive bot ("SmartBot," "avatar," etc.), 702A and 702B, may be an artificial intelligence (AI) based application that can translate customer request and/or speech into system commands. The interactive bot, 702A and 702B, may available to the user of the user interface who seeks to view blockchain analytics data 708 generated from information in the blockchain 710. It is contemplated that this user may be a participant of the blockchain used in the transaction and dispute management system, and therefore this user may include, for example, an issuer 706A, or a merchant 706B.

The translator application program interface (API), 704A and 704B, may be the interface layer that may convert speech or text that is input by the user (e.g., an issuer 706A or a merchant 706B) via a user interface into commands that may retrieve information from or display various aspects of blockchain analytics 708. Furthermore, the blockchain analytics 708 may be generated based on the data that participants of the blockchain (e.g., issuers, consumers, merchants, and/or acquirers) add to the blockchain 710 and/or shared ledger via the blockchain user interface 712, for example, during a transaction or transaction dispute management. Furthermore, blockchain analytics 708 may be generated based on methods presented in FIG. 5A-5B. Thus, blockchain analytics 708 may be a system that takes structured and/or unstructured data from, blockchain disputes system and may slice and dice the data to provide actionable insights.

The interactive bot technology may be used to enhance and improve customer experience and anticipate the customer before the customer explicitly requests information. Thus, the interactive bot technology can be effective in areas where participants of a transaction or transaction dispute need to be educated on the process and when to anticipate a response.

Interactive bots 702A and 702B may be dependent on the blockchain analytics 708 to drive the optimal customer experience and may provide useful information to participants (e.g., merchant, issuer, etc.) of the blockchain who are able to view blockchain analytics via a user interface. For example, a user may be able to gather information on the mean times for response for a disputing party of a transaction dispute based upon historical data.

FIG. 8 depicts an exemplary screenshot of a user interface for analyzing transaction attributes and dispute information using a blockchain interface server. Participants of a payment transaction, as members of one or more blockchain networks used in the systems and methods for transaction dispute management, as presented in various embodiments herein, may be able to view blockchain analytics on a user interface. The participants (e.g., issuer, merchant, acquirer, consumer, etc.) may include the parties of a transaction or a transaction dispute, and the blockchain analytics may be generated according to methods presented in FIGS. 5A-5B. As illustrated in an exemplary screenshot, the blockchain interface server may identify the original transaction 802, for which a user wishes to seek more information regarding one or more attributes of the transaction. Furthermore, the particular block 804 in which an attribute or transaction information is stored may also be identified. The user may be able to gain a summary 806 of the current transaction, or gain information on a particular attribute of the transaction. For example, a user may view information related to the consumer 808 of the transaction (or any other party of the transaction). As shown in FIG. 8, when selecting to gain more information about the consumer of the transaction, a user may be able to view, for example a consumer's transaction history 810, incidents of fraud 812, an encrypted identifier of the consumer's primary account number 814, an encrypted identifier of the user identification number 816. The user may be able to view the consumer's transaction history in multiple forms, e.g., tables 810A, pie charts 810B, bar graphs 810C, etc. A transaction history 810 of the consumer may display for example, the number of transactions conducted by the transaction over time 818. In some embodiments, the blockchain analytics performed and displayed by the blockchain interface server on the blockchain may also present a consumer's overall success rate 820 in transaction disputes, for example, to ascertain how difficult it is to overcome a dispute settlement process with a consumer. The user may also be able to detect incidents of fraud 812 resulting from the consumer, for example, to proactively avoid fraud by stopping a transaction with the consumer.

In other embodiments, the user may also view information related to the transacted good(s) and/or service(s) of the transaction 822, geographical information of the transaction 824, temporal information of the transaction 826, or any other attribute. The methods performed by the blockchain interface server of gaining more information for the various attributes of the current transaction from the blockchain may include gaining information on other transactions sharing the attribute, and may employ methods presented in FIGS. 5A-5B. In further embodiments, the user may also view information related to more than one attributes at a time. For example, blockchain analytics presented by the blockchain interface server may provide information on a consumer's transaction involving a particular good and/or service over time (from other merchants, for example). In another example, blockchain analytics presented by the blockchain interface server may be able to provide information on incidents of dispute arising from a particular participant of the blockchain over a particular transacted good or service. These information may be used, for example, to proactively identify and/or report fraud.

In some embodiments, the blockchain interface server, via the user interface (as shown in FIG. 8) on a user device may be able to enhance the user's experience in able to use blockchain analytics, via an interactive bot 828 (e.g., "SmartBot"). The interactive bot 828 may receive input from the user to direct the user towards finding the appropriate information from the blockchain analytics and/or use artificial intelligence (AI) technology to detect information about the user and proactively predict what the user may be looking for. The interactive bot may be implemented based on methods described in FIG. 8.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method for dispute settlement using multiple blockchains, the method comprising:
   receiving, by a user interface, a user input for a transaction, wherein the user input include speech-based input, text-based input, or a combination thereof;
   translating, by a translator application program interface (API), the user input into a system command, wherein the translator API is an artificial intelligence (AI) based application that detects user information and predicts requirements of the user;
   generating and displaying, by a blockchain interface server on the user interface, a graphical interface comprising analytics data based on the translated system command;
   encrypting and entering, by the blockchain interface server, in a data entry of a first blockchain, a transaction identifier indicating an initiation of and identification of the transaction, wherein the transaction includes a series of transaction events;
   monitoring, by the blockchain interface server, a status of the transaction based on a decoded transaction identifier;
   receiving, by the blockchain interface server, the status and an identifier of an account for each of two or more participants of the transaction;
   executing, by the blockchain interface server, one or more iterations of:
      detecting an indication of a dispute over one or more attributes of the transaction using a computerized transaction protocol;
      identifying a new transaction event in the series of transaction events stored in the first blockchain, using the transaction identifier, wherein the new transaction event has not been identified in a previous iteration;
      presenting the new transaction event to the two or more participants of the transaction on the user interface of the two or more participants;
      searching a second blockchain for one or more other past transactions that include the one or more disputed attributes;
      generating, on the user interface, an analytics report of the one or more other past transactions having the one or more disputed attributes, wherein the analytics report include the analytics data that indicate usage of the one or more disputed attributes in the one or more other past transactions;
         relaying, by the blockchain interface server, the analytics report to a third blockchain for further processing the transaction and generating a blockchain dispute resolution using the computerized transaction protocol and the analytics report;
      receiving a proposed change to the one or more disputed attributes by one of the two or more participants of the transaction;
      determining the two or more participants rejects the proposed change and executing a dispute settlement process to revise the one or more disputed attributes by:
         generating a data structure in a shared ledger of the first blockchain to form an electronic contract governing the transaction;
         inputting the one or more disputed attributes and the proposed change into the data structure; and
         executing the computerized transaction protocol to resolve the one or more disputed attributes based on predetermined rules for determining a veracity of a disputed attribute of the transaction; and
      receiving, by the blockchain interface server, from the third blockchain, an indication of acceptance of a result of the blockchain dispute resolution by the two or more participants and settling the one or more disputed attributes of the transaction.

2. The method of claim 1, wherein the third blockchain is a real-time gross settlement system designed to comply with risk, privacy, and compliance requirements, and wherein the analytics data indicate a fraudulent transaction based on historical data.

3. The method of claim 1, further comprising:
   presenting the indication of the dispute, the proposed change to the one or more disputed attributes, and the one or more revised attributes the user interface.

4. The method of claim 1, wherein presenting the one or more revised attributes of the transaction to the two or more participants of the transaction on the user interface, comprises:
   saving, in the generated data structure, the one or more revised attributes of the transaction as the new transaction event in the series of transaction events of the transaction, wherein the blockchain interface server decodes the transaction information stored in the shared ledger via a decoder to make information understandable to the participants.

5. The method of claim 1, wherein accepting or rejecting of the proposed change by the two or more participants of the transaction comprises:
   saving, in the generated data structure, the acceptance or rejection as the new transaction event in the series of transaction events of the transaction, wherein the rejection include additional information pertaining to continued dispute, and wherein the additional information include attributes of the transaction the participant disputes.

6. The method of claim 1, wherein each transaction event of the series of transaction events of the transaction is one or more data structures in the shared ledger of the first blockchain, and wherein a consensus protocol is followed by entities maintaining the shared ledger for a consistent view, and wherein the shared ledger is accessible to the two or more participants of the transaction.

7. The method of claim 1, wherein the two or more participants of the transaction comprises at least an issuer of a payment source account of a user and an acquirer of the payment account of a merchant.

8. The method of claim 1, wherein, if the series of transaction events requires an input from a participant of the transaction for establishing a subsequent transaction event in the series of transaction events, presenting the new transaction event to the two or more participants of the transaction;
prompting, via the user interface, the participant of the transaction to provide the input; and
receiving, via the user interface, the input by the participant of the transaction.

9. The method of claim 8, further comprising, one or more of:
storing, in the generated data structure, the received input as the new transaction event in the series of transaction events of the transaction; and
presenting the received input to one or more other participants of the transaction on the user interface.

10. The method of claim 1, further comprising:
receiving, from a participant of the transaction, an input of a selection of the one or more attributes of the transaction to analyze other transactions that have, as common, the selected one or more attributes;
searching the shared ledger and compiling a list of other transactions that have, as common, the selected one or more attributes;
receiving data of other attributes for each transaction of the list of other transactions; and
generating and displaying, on the user interface, the analytics report of the other transactions having, as common, the selected one or more attributes.

11. The method of claim 1, wherein the attributes comprise: (1) an identifier of an issuer of a payment source account of a user for applying resources to the first transaction, (2) an identifier of an acquirer of a payment account of a merchant for depositing the applied resources for the first transaction, (3) an amount of resources to be applied to a first transaction, and (4) an identification of good or service transacted; and one or more of:
an identifier of the merchant;
an identifier of a consumer;
an identifier of the account of a participant of the transaction;
an itemization of the goods and/or services transacted for;
any geographical and/or temporal information of the transaction;
any taxes, tips, and/or gratuities;
any discounts, coupons, reductions;
any fees directed towards acquirers, issuers, payment networks; and
currency exchange rates.

12. The method of claim 1, wherein the AI based application utilizes the predicted requirements of the user to predict information the participant searches in a next instance of time.

13. A system for dispute settlement using multiple blockchains, the system comprising:
a data storage device storing instructions for observing, alerting, and executing blockchain-based payment transactions and dispute settlement; and
one or more processors configured to execute the instructions to perform a method including:
receiving, by a user interface, a user input for a transaction, wherein the user input include speech-based input, text-based input, or a combination thereof;
translating, by a translator application program interface (API), the user input into a system command, wherein the translator API is an artificial intelligence (AI) based application that detects user information and predicts requirements of the user;
generating and displaying, by a blockchain interface server on the user interface, a graphical interface comprising analytics data based on the translated system command;
encrypting and entering, by the blockchain interface server, in a data entry of a first blockchain, a transaction identifier indicating an initiation of and identification of the transaction, wherein the transaction includes a series of transaction events;
monitoring, by the blockchain interface server, a status of the transaction based on a decoded transaction identifier;
receiving, by the blockchain interface server, the status and an identifier of an account for each of two or more participants of the transaction;
executing, by the blockchain interface server, one or more iterations of:
detecting an indication of a dispute over one or more attributes of the transaction using a computerized transaction protocol;
identifying a new transaction event in the series of transaction events stored in the first blockchain, using the transaction identifier, wherein the new transaction event has not been identified in a previous iteration;
presenting the new transaction event to the two or more participants of the transaction on the user interface of the two or more participants;
searching a second blockchain for one or more other past transactions that include the one or more disputed attributes;
generating, on the user interface, an analytics report of the one or more other past transactions having the one or more disputed attributes, wherein the analytics report include the analytics data that indicate usage of the one or more disputed attributes in the one or more other past transactions;
relaying, by the blockchain interface server, the analytics report to a third blockchain for further processing the transaction and generating a blockchain dispute resolution using the computerized transaction protocol and the analytics report;
receiving a proposed change to the one or more disputed attributes by one of the two or more participants of the transaction;

determining the two or more participants rejects the proposed change and executing a dispute settlement process to revise the one or more disputed attributes by:
  generating a data structure in a shared ledger of the first blockchain to form an electronic contract governing the transaction;
  inputting the one or more disputed attributes and the proposed change into the data structure; and
  executing the computerized transaction protocol to resolve the one or more disputed attributes based on predetermined rules for determining a veracity of a disputed attribute of the transaction; and
  receiving, by the blockchain interface server, from the third blockchain, an indication of acceptance of a result of the blockchain dispute resolution by the two or more participants and settling the one or more disputed attributes of the transaction.

14. The system of claim 13, wherein the third blockchain is a real-time gross settlement system designed to comply with risk, privacy, and compliance requirements, and wherein the analytics data indicate a fraudulent transaction based on historical data.

15. The system of claim 13,
further comprising:
presenting the indication of the dispute, the proposed change to the one or more disputed attributes, and the one or more revised attributes on the user interface.

16. A non-transitory machine readable medium storing instructions that, when executed by a blockchain interface server, cause the blockchain interface server to perform a method for dispute settlement, using the blockchain interface server, the method including:
  receiving, by a user interface, a user input for a transaction, wherein the user input include speech-based input, text-based input, or a combination thereof;
  translating, by a translator application program interface (API), the user input into a system command, wherein the translator API is an artificial intelligence (AI) based application that detects user information and predicts requirements of the user;
  generating and displaying, by the blockchain interface server on the user interface, a graphical interface comprising analytics data based on the translated system command;
  encrypting and entering, by the blockchain interface server, in a data entry of a first blockchain based on the command, a transaction identifier indicating an initiation of and identification of the transaction, wherein the transaction includes a series of transaction events;
  monitoring, by the blockchain interface server, a status of the transaction based on a decoded transaction identifier;
  receiving, by the blockchain interface server, the status and an identifier of an account for each of two or more participants of the transaction;
  executing, by the blockchain interface server, one or more iterations of:
    detecting an indication of a dispute over one or more attributes of the transaction using a computerized transaction protocol;
    identifying a new transaction event in the series of transaction events stored in the first blockchain, using the transaction identifier, wherein the new transaction event has not been identified in a previous iteration;
    presenting the new transaction event to the two or more participants of the transaction on the user interface of the two or more participants;
    searching a second blockchain for one or more other past transactions that include the one or more disputed attributes;
    generating, on the user interface, an analytics report of the one or more other past transactions having the one or more disputed attributes, wherein the analytics report include the analytics data that indicate usage of the one or more disputed attributes in the one or more other past transactions;
    relaying, by the blockchain interface server, the analytics report to a third blockchain for further processing the transaction and generating a blockchain dispute resolution using the computerized transaction protocol and the analytics report;
    receiving a proposed change to the one or more disputed attributes by one of the two or more participants of the transaction;
    determining the two or more participants rejects the proposed change and executing a dispute settlement process to revise the one or more disputed attributes by:
      generating a data structure in a shared ledger of the first blockchain to form an electronic contract governing the transaction;
      inputting the one or more disputed attributes and the proposed change into the data structure; and
      executing the computerized transaction protocol to resolve the one or more disputed attributes based on predetermined rules for determining a veracity of a disputed attribute of the transaction; and
      receiving, by the blockchain interface server, from the third blockchain, an indication of acceptance of a result of the blockchain dispute resolution by the two or more participants and settling the one or more disputed attributes of the transaction.

17. The machine readable medium of claim 16, wherein the third blockchain is a real-time gross settlement system designed to comply with risk, privacy, and compliance requirements, and wherein the analytics data indicate a fraudulent transaction based on historical data.

18. The machine readable medium of claim 16, further comprising:
presenting the indication of the dispute, the proposed change to the one or more disputed attributes, and the one or more revised attributes on the user interface.

* * * * *